(12) United States Patent
Hirzel

(10) Patent No.: US 7,190,101 B2
(45) Date of Patent: Mar. 13, 2007

(54) STATOR COIL ARRANGEMENT FOR AN AXIAL AIRGAP ELECTRIC DEVICE INCLUDING LOW-LOSS MATERIALS

(75) Inventor: Andrew D. Hirzel, Kalamazoo, MI (US)

(73) Assignee: Light Engineering, Inc., Indianapolis, IN (US)

( * ) Notice: Subject to any disclaimer, the term of this patent is extended or adjusted under 35 U.S.C. 154(b) by 0 days.

(21) Appl. No.: 10/979,336

(22) Filed: Nov. 2, 2004

(65) Prior Publication Data

US 2005/0093393 A1 May 5, 2005

Related U.S. Application Data

(60) Provisional application No. 60/516,789, filed on Nov. 3, 2003.

(51) Int. Cl.
*H02K 1/02* (2006.01)
*H02K 3/04* (2006.01)
*H02K 3/28* (2006.01)
*H02K 21/00* (2006.01)

(52) U.S. Cl. .................... 310/268; 310/180; 310/208

(58) Field of Classification Search .......... 310/156.02, 310/156.47, 156.25, 114, 216, 254, 266, 179–180, 310/184–185, 198, 208
See application file for complete search history.

(56) References Cited

U.S. PATENT DOCUMENTS

| | | | | |
|---|---|---|---|---|
| 3,153,157 | A | * 10/1964 | Rabe | 310/46 |
| 4,142,571 | A | 3/1979 | Narasimhan | 164/88 |
| 4,187,441 | A | 2/1980 | Oney | 310/112 |
| 4,265,682 | A | * 5/1981 | Tsuya et al. | 148/112 |
| 4,319,152 | A | * 3/1982 | van Gils | 310/201 |
| 4,578,610 | A | 3/1986 | Kliman et al. | 310/156 |
| RE32,925 | E | 5/1989 | Chen et al. | 148/403 |
| 4,865,657 | A | 9/1989 | Das et al. | 148/113 |
| 4,881,989 | A | 11/1989 | Yoshizawa et al. | 148/302 |

(Continued)

FOREIGN PATENT DOCUMENTS

WO 9919962 A1 * 4/1999

(Continued)

OTHER PUBLICATIONS

Hendershot et al., "Design of Brushless Permant Magnet Motors", Jan. 1994, pp. 3-1, and 3-6 to 3-11, Claredon Press.*

*Primary Examiner*—Julio Gonzalez
*Assistant Examiner*—Tran N. Nguyen
(74) *Attorney, Agent, or Firm*—Ernest D. Buff & Associates, LLC; Ernest D. Buff; Gordon E. Fish

(57) ABSTRACT

A dynamoelectric, rotating electric machine includes a stator assembly that includes stacked stator coil windings. The machine is preferably a polyphase, axial airgap device. Improved slot filling results from the stacked stator coil configuration. Device performance capability is thereby increased. The stator assembly of the electric device has a magnetic core made from low loss, high frequency material. A high pole count permits the electrical device to operate at high commutating frequencies, with high efficiency, high power density and improved performance characteristics. Low-loss materials incorporated by the device include amorphous metals, nanocrystalline metals, optimized Si—Fe alloys, grain-oriented Fe-based materials or non-grain-oriented Fe-based materials.

4 Claims, 12 Drawing Sheets

U.S. PATENT DOCUMENTS

| | | | |
|---|---|---|---|
| 5,179,306 A * | 1/1993 | Nasar | 310/14 |
| 5,220,228 A * | 6/1993 | Sibata | 310/254 |
| 5,334,898 A * | 8/1994 | Skybyk | 310/268 |
| 5,394,321 A * | 2/1995 | McCleer et al. | 363/131 |
| 5,590,003 A * | 12/1996 | Dunfield et al. | 360/98.07 |
| 5,691,588 A * | 11/1997 | Lutz et al. | 310/92 |
| 5,935,347 A | 8/1999 | Suzuki et al. | 148/121 |
| 6,037,696 A * | 3/2000 | Sromin et al. | 310/268 |
| 6,049,149 A * | 4/2000 | Lin et al. | 310/68 R |
| 6,188,159 B1 * | 2/2001 | Fan | 310/254 |
| 6,259,347 B1 | 7/2001 | Sines | 336/219 |
| 6,462,456 B1 * | 10/2002 | DeCristofaro et al. | 310/216 |
| 6,534,938 B1 * | 3/2003 | Wu et al. | 318/254 |
| 6,555,941 B1 * | 4/2003 | Zepp et al. | 310/191 |
| 6,603,237 B1 * | 8/2003 | Caamano | 310/254 |
| 6,617,746 B1 * | 9/2003 | Maslov et al. | 310/254 |
| 6,827,557 B2 * | 12/2004 | Kim | 417/35 |
| 2004/0245879 A1 * | 12/2004 | Hirzel et al. | 310/156.01 |
| 2004/0251759 A1 * | 12/2004 | Hirzel | 310/114 |
| 2004/0251761 A1 * | 12/2004 | Hirzel | 310/156.25 |
| 2005/0040728 A1 * | 2/2005 | Hirzel | 310/268 |
| 2005/0073212 A1 * | 4/2005 | Semones et al. | 310/216 |

FOREIGN PATENT DOCUMENTS

WO    9966624 A1 * 12/1999

* cited by examiner w = slot width
D = stator outer diameter
d = stator inner diameter T = tooth height
H = overall height

STATOR COIL ARRANGEMENT FOR AN AXIAL AIRGAP ELECTRIC DEVICE INCLUDING LOW-LOSS MATERIALS

RELATED U.S. APPLICATION DATA

This application claims the benefit of co-pending U.S. Provisional Patent Application Ser. No. 60/516,789, filed Nov. 3, 2003, and entitled "Stator Coil Arrangement For An Axial Airgap Electric Device Including Low-Loss Materials," which is incorporated herein in the entirety by reference thereto.

BACKGROUND OF THE INVENTION

1. Field of the Invention

The invention relates to a dynamoelectric, rotating machine; and more particularly, to an axial airgap, dynamoelectric, rotating machine comprising a rotor assembly and a stator assembly that includes a stacked stator coil arrangement.

2. Description of the Prior Art

The electric motor and generator industry is continuously searching for ways to provide dynamoelectric, rotating machines with increased efficiencies and power densities. As used herein, the term "motor" refers to all classes of motoring and generating machines which convert electrical energy to rotational motion and vice versa. Such machines include devices that may alternatively function as motors, generators, and regenerative motors. The term "regenerative motor" is used herein to refer to a device that may be operated as either an electric motor or a generator. A wide variety of motors are known, including permanent magnet, wound field, induction, variable reluctance, switched reluctance, and brush and brushless types. They may be energized directly from a source of direct or alternating current provided by the electric utility grid, batteries, or other alternative source. Alternatively, they may be supplied by current having the requisite waveform that is synthesized using electronic drive circuitry. Rotational energy derived from any mechanical source may drive a generator. The generator's output may be connected directly to a load or conditioned using power electronic circuitry. Optionally, a given machine is connected to a mechanical source that functions as either a source or sink of mechanical energy during different periods in its operation. The machine thus can act as a regenerative motor, e.g. by connection through power conditioning circuitry capable of four-quadrant operation.

Rotating machines ordinarily include a stationary component known as a stator and a rotating component known as a rotor. Adjacent faces of the rotor and stator are separated by a small airgap traversed by magnetic flux linking the rotor and stator. It will be understood by those skilled in the art that a rotating machine may comprise plural, mechanically connected rotors and plural stators. Virtually all rotating machines are conventionally classifiable as being either radial or axial airgap types. A radial airgap type is one in which the rotor and stator are separated radially and the traversing magnetic flux is directed predominantly perpendicular to the axis of rotation of the rotor. In an axial airgap device, the rotor and stator are axially separated and the flux traversal is predominantly parallel to the rotational axis.

Except for certain specialized types, motors and generators generally employ soft magnetic materials of one or more types. By "soft magnetic material" is meant one that is easily and efficiently magnetized and demagnetized. The energy that is inevitably dissipated in a magnetic material during each magnetization cycle is termed hysteresis loss or core loss. The magnitude of hysteresis loss is a function both of the excitation amplitude and frequency. A soft magnetic material further exhibits high permeability and low magnetic coercivity. Motors and generators also include a source of magnetomotive force, which can be provided either by one or more permanent magnets or by additional soft magnetic material encircled by current-carrying windings. By "permanent magnet material," also called "hard magnetic material," is meant a magnetic material that has a high magnetic coercivity and strongly retains its magnetization and resists being demagnetized. Depending on the type of motor, the permanent and soft magnetic materials may be disposed either on the rotor or stator.

By far, the preponderance of motors currently produced use as soft magnetic material various grades of electrical or motor steels, which are alloys of Fe with one or more alloying elements, especially including Si, P, C, and Al. Most commonly, Si is a predominant alloying element. While it is generally believed that motors and generators having rotors constructed with advanced permanent magnet material and stators having cores made with advanced, low-loss soft materials, such as amorphous metal, have the potential to provide substantially higher efficiencies and power densities compared to conventional radial airgap motors and generators, there has been little success in building such machines of either axial or radial airgap type. Previous attempts at incorporating amorphous material into conventional radial or axial airgap machines have been largely unsuccessful commercially. Early designs mainly involved substituting the stator and/or rotor with coils or circular laminations of amorphous metal, typically cut with teeth through the internal or external surface. Amorphous metal has unique magnetic and mechanical properties that make it difficult or impossible to directly substitute for ordinary steels in conventionally designed motors.

A number of applications in current technology, including widely diverse areas such as high-speed machine tools, aerospace motors and actuators, and compressor drives, require electrical motors operable at high speeds (i.e., high rpm), many times in excess of 15,000–20,000 rpm, and in some cases up to 100,000 rpm. High speed electric machines are almost always manufactured with low pole counts, lest the magnetic materials in electric machines operating at higher frequencies experience excessive core losses that contribute to inefficient motor design. This is mainly due to the fact that the soft material used in the vast majority of present motors is a silicon-iron alloy (Si—Fe). It is well known that losses resulting from changing a magnetic field at frequencies greater than about 400 Hz in conventional Si—Fe-based materials causes the material to heat, oftentimes to a point where the device cannot be cooled by any acceptable means.

To date it has proven very difficult to cost effectively provide readily manufacturable electric devices, which take advantage of low-loss materials. Previous attempts to incorporate low-loss materials into conventional machines generally failed, since the early designs typically relied on merely substituting new soft magnetic materials, such as amorphous metal, for conventional alloys, such as silicon-iron, in machine's magnetic cores. The resulting electric machines have sometimes provided increased efficiencies with less loss, but they generally suffer from an unacceptable reduction in power output, and significant increases in cost associated with handling and forming the amorphous metal. As a result, they have not achieved commercial success or market penetration.

For example, U.S. Pat. No. 4,578,610 discloses a highly efficient motor having a stator constructed by simply coiling a strip of amorphous metal tape, wherein the amorphous strip is wound and then slotted and a suitable stator winding is then placed within the slots.

U.S. Pat. No. 4,187,441 discloses a high power-density machine having spirally wound laminated magnetic cores made from amorphous metal ribbon having slots for receiving stator windings. The patent further discloses using a laser beam for cutting the slots into the amorphous metal ribbon.

A problem that is especially significant in high slot-count devices is the amount of slot space that cannot be filled with windings, because insulation must be interspersed between the stator windings and the stator core. The insulation thickness is relatively fixed, being determined by the operating voltage of the electric device. Therefore, there is an upper limit on the percentage of the total slot area that can be devoted to stator coil windings. This value is ordinarily less than 50% when known stator coil winding techniques are employed in manufacturing conventionally configured, high pole count electric devices. The limit on usable slot area in turn limits the current density that determines the magnetomotive force (amp-turns) that can be generated. As a result, the output power and performance of the electric device are also limited.

Accordingly, there remains a need in the art for highly efficient electric devices, which take full advantage of the specific characteristics associated with low-loss material, thus eliminating many of the disadvantages associated with conventional machines. Ideally, an improved machine would provide higher efficiency of conversion between mechanical and electrical energy forms. Improved efficiency in generating machines powered by fossil fuels would concomitantly reduce air pollution. The machine would be smaller, lighter, and satisfy more demanding requirements of torque, power, and speed. Cooling requirements would be reduced. Motors operating from battery power would operate longer for a given charge cycle. For certain applications, axial airgap machines are better suited because of their size and shape and their particular mechanical attributes. Similar improvements in machine properties are sought for both axial and radial airgap devices.

SUMMARY OF THE INVENTION

The present invention provides a dynamoelectric electric machine comprising a rotor assembly and a stator assembly that includes a backiron section and a number of stator tooth sections, along with stacked stator phase windings. A slot between each adjacent pair of tooth sections accommodates a plurality of the stacked stator phase windings. Preferably two of such windings are present in each slot. The rotor assembly is supported for rotation about an axis and includes a plurality of poles. The electric device can have any pole and slot count ranging from low to high. The rotor assembly is arranged and disposed for magnetic interaction with the stator assembly. Preferably the stator comprises a generally toroidal structure employing laminated layers composed of at least one low core loss material selected from the group consisting of amorphous and nanocrystalline metals and optimized Fe-based alloy. However, other soft magnetic materials may also be used in constructing all or part of the stator assembly. The use of low core loss, advanced soft magnetic materials affords significant flexibility in design, by making possible a wider range of pole counts and commutating frequencies, while also maintaining high operating efficiency, high power density, and a wide range of possible operating speeds.

Examples of electric machines that can be produced and operated in accordance with the invention include, but are not limited to, electric motors, generators, and regenerative motors. One or more of the electric devices could be a component in a composite device or system. An example of such a composite device is a compressor comprising one or more electric motors, where the one or more electric motors may be integral with a fan. The machine is preferably has an axial airgap configuration, but may also be a radial airgap device.

The invention further provides a method for constructing a dynamoelectric machine, comprising: (i) providing at least one stator assembly comprising a backiron section and a plurality of tooth sections, the stator assembly having a slot between each adjacent pair of the tooth sections and a plurality of stacked stator phase windings, each winding encircling one or more of said tooth sections; and (ii) providing at least one rotor assembly supported for rotation about an axis and including a plurality of poles, the rotor assembly being arranged and disposed for magnetic interaction with the at least one stator assembly. Preferably two stacked phase windings are present in each of the slots and the windings consist of equal numbers of up-coils and down-coils.

A dynamoelectric machine system comprises a dynamoelectric machine of the aforementioned type and a power electronics means for interfacing and controlling the machine. The power electronics means is operably connected to the machine.

The novel stator coil winding and stacking techniques provided in an aspect of the present invention result in greatly increased stator slot fill, which is a measure of the percentage of stator coil winding in the slot relative to the total volume of the slots. As a result, preferred electric devices of the present invention provide increased performance, power, and efficiency.

The stator assembly of the present device preferably has a magnetic core made from low loss, high frequency material. More preferably, the stator's magnetic core is made of amorphous metals, nanocrystalline metals, optimized Si—Fe alloys, grain-oriented Fe-based materials or non-grain-oriented Fe-based materials. The introduction of amorphous metals, nanocrystalline metals, optimized Si—Fe alloys, grain-oriented Fe-based materials or non-grain-oriented Fe-based materials into electrical devices enables the device's frequency to be increased above 400 Hz with only a relatively small increase in core loss, as compared to the large increase exhibited in conventional machines, thus yielding a highly efficient electric device capable of providing increased power. The invention further provides a highly efficient electric device with a high pole count capable of providing increased power density and a torque-speed curve extending to higher speed, while retaining improved efficiency,

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

DESCRIPTION OF THE PREFERRED EMBODIMENTS

Preferred embodiments of the present invention will be explained in greater detail hereinafter, with reference to the accompanying drawings. The present invention involves the design and manufacture of an electric device, such as a brushless motor, having a wound stator core made from low-loss material and employing stacked stator windings. Preferably the stator core includes amorphous metals, nanocrystalline metals, optimized Si—Fe alloys, grain-oriented Fe-based materials or non-grain-oriented Fe-based materials.

General Device Structure

Figure 1A:
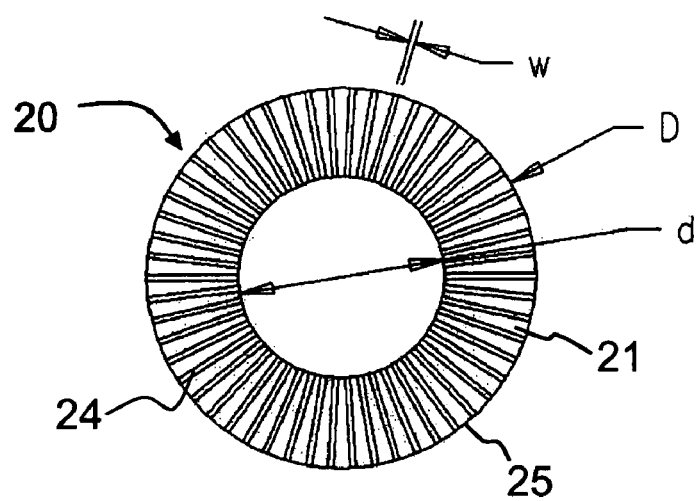
FIGS. 1A and 1B illustrate top and side views, respectively, of a stator structure of the invention, showing the stator core with machined stator slots and the backiron.
Figure 1B:
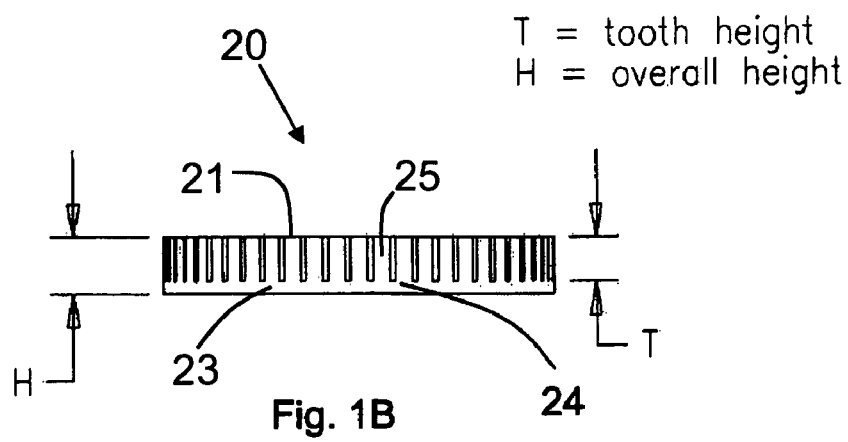
Figure 2:
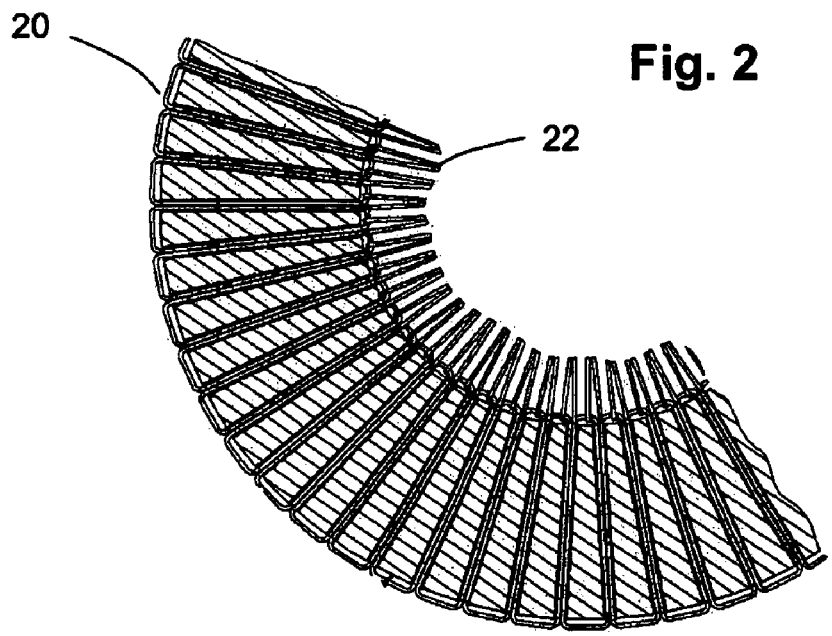
FIG. 2 illustrates a section of a stator structure of the invention wound with stator windings.

Commonly assigned U.S. Provisional Application Ser. No. 60/444,271 ("the '271 application") and U.S. patent application Ser. No. 10/769,094 ("the '094 application"), which are both incorporated herein in the entirety by reference thereto, provide an electric device having a rotor assembly and a stator arranged in an axial airgap configuration, but with a side-by-side winding configuration. The stator includes a backiron section and a plurality of stator tooth sections, preferably made using low-loss, high-frequency materials. FIG. 1 illustrate in top view (FIG. 1A) and side view (FIG. 1B) a stator assembly 20 according to an aspect of the '094 application, showing a unitary structure including stator tooth sections 25 depending from backiron 23. Slot spaces 24 between adjacent tooth sections are appointed to receive stator windings 22 wound around the tooth sections 25 using a conventional, side-by-side disposition of the windings, as shown in FIG. 2. Preferably the one or more stators are formed from low-loss materials, such as amorphous metal, nanocrystalline metal, or optimized Fe-based alloy. Alternatively, grain-oriented or non-grain-oriented Fe-based material may be used. The backiron and tooth sections may be formed either as the unitary structure depicted, in which the tooth sections 25 depend integrally from backiron section 23, or as separate components secured together by any appropriate means. For example, the constituent parts may be joined using an adhesive, clamping, welding, or other methods known in the art. A variety of adhesive agents may be suitable, including those composed of epoxies, varnishes, anaerobic adhesives, cyanoacrylates, and room-temperature-vulcanized (RTV) silicone materials. Adhesives desirably have low viscosity, low shrinkage, low elastic modulus, high peel strength, high operating temperature capability, and high dielectric strength. The stator construction depicted by FIGS. 1A–1B is useful in the practice of the present invention, as are other forms of stator construction provided by the aforementioned '271 and '094 applications, and still others that incorporate low loss materials and are compatible with the stacked winding configuration described hereinbelow.

The present invention further provides novel stator coil winding and stacking techniques for application, preferably in axial airgap electric devices. Instead of the side-by-side arrangement conventionally used in motor winding, the present machine employs stacked windings. Embodiments wherein the stator comprises separate teeth and backiron sections may be wound with stator windings before or after the components are assembled. The windings may also be formed as separate assemblies and then slipped into position over the free end of tooth sections 25. The stator 20 and its windings 22 can be placed in a stator carrier (not shown) and potted with an appropriate organic dielectric.

The present dynamoelectric machine further includes a rotor assembly having a plurality of circumferentially spaced-apart permanent magnets arranged in an axial configuration relative to the stator assembly. The present machine may comprise one or more rotor assemblies and one or more stator assemblies. Accordingly, the terms "a rotor" and "a stator" as used herein with reference to electric machines mean a number of rotor and stator assemblies ranging from one to as many as three or more.

In an aspect of the invention, there is provided a method for constructing and winding a stator assembly, such as that depicted by FIGS. 1–2 and others described herein. A metal core is initially formed by spirally winding low-loss, high-frequency strip material into a toroid. This toroid has the shape of a generally right circular cylindrical shell having an inner diameter and an outer diameter when viewed in the axial direction. The annular end surface region 21 extending radially from inner diameter "d" to outer diameter "D", and circumferentially about the as-formed full toroid, defines a surface area. The metal core has an axial extent that defines a toroid height "H." After winding, the core is machined to provide slots 24 having outer width "w" that are generally radially directed. The depth of slots 24 extends axially only part-way through the toroid height, thereby defining teeth and slots having a slot height "T." The slots reduce the total end surface area of the metal core. The portion of the annular region left after the removal of the slots is the total area (TA), also referred to as the amorphous metal area (AMA) for the embodiments in which the low-loss, high-frequency material is an amorphous metal. Because the slots 24 extend fully from the inner diameter d to the outer diameter D, the stator core's circumference at the inside and outside diameters in the slotted portion of the toroid are not continuous. The removal of material from the slot spaces produces a plurality of teeth 25. There are an equal number of teeth and slots. The circumferentially continuous material that remains below the slot depth may function as the backiron section 23, which provides closure for flux in the tooth sections 25. In preferred embodiments, the narrowest part of a tooth is not less than 0.1 inch (2.5 mm) for the sake of formability and mechanical integrity. The slots 24 are wound with conducting stator windings 22 according to a winding scheme preselected for a given electric device design.

Stator Coil Winding And Stacking Techniques

In particular, an aspect of the present invention provides stator coil winding and stacking techniques which increase the stator winding coil fill of electric devices. Although applicable to radial airgap devices, the present stacked coil configuration is readily implemented in fabricating stators for axial airgap machines using modular coils, which can be slipped over tooth sections that are not tapered in the axial direction. In preferred embodiments, the techniques of the invention are applied to high pole count axial airgap electric devices with a slot per phase per pole (SPP) ratio of 0.5, wherein there is typically only one discrete coil per stator tooth. However, the methods of the present invention are also applicable to axial airgap electric devices with winding schemes having values of SPP other than 0.5.

Figure 5:
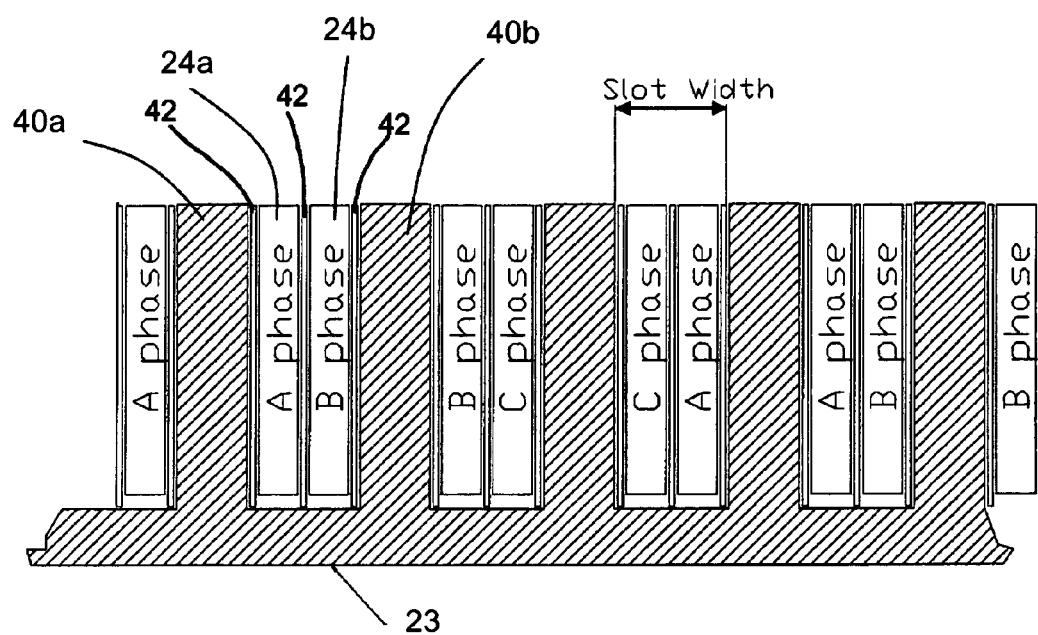
FIG. 5 illustrates a low slot count stator structure wound using conventional winding techniques.
Figure 6:
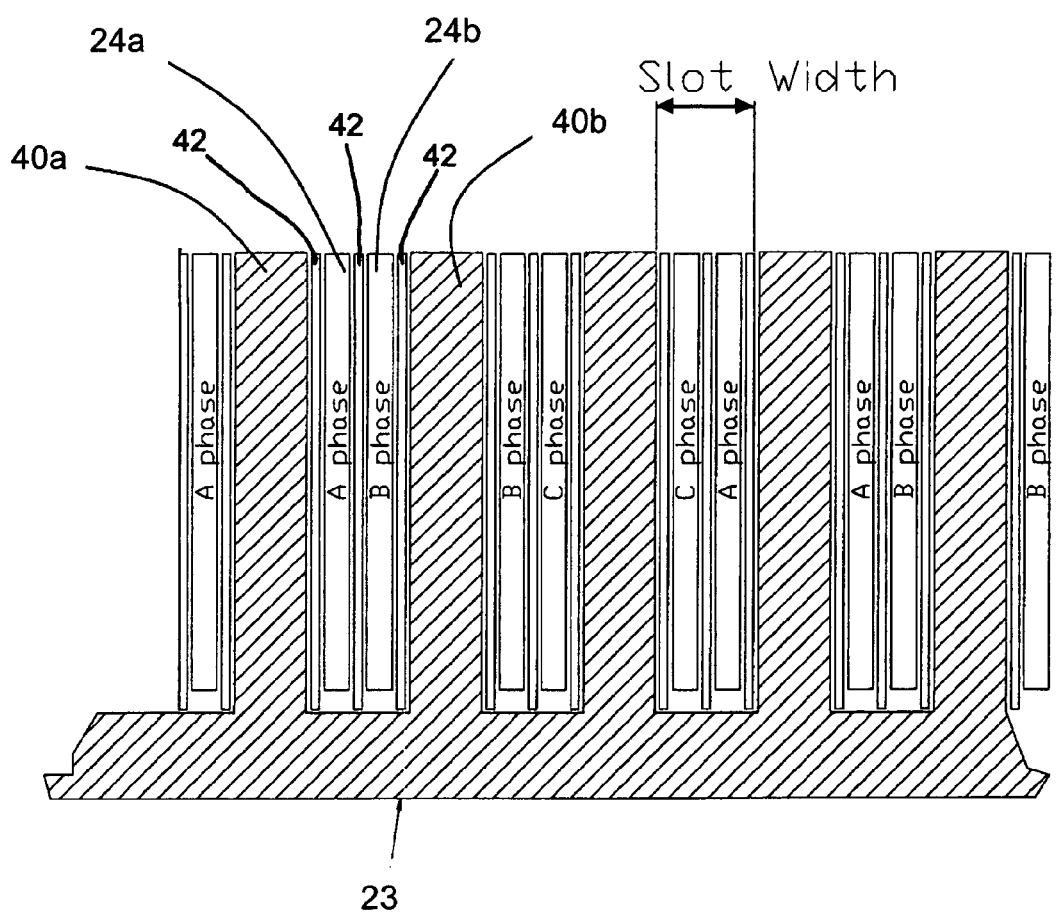
FIG. 6 illustrates a high slot count stator structure wound using conventional winding techniques.

A conventional winding configuration for a three-phase, axial airgap machine is illustrated in FIG. 5, which shows a low slot count device, and in FIG. 6, for a high slot count device. Successive teeth around the stator circumference are wound with stator phase windings in a sequence of A-B-C-A-B-C . . . , wherein the letters represent the three electrical phases. Each stator slot thus contains the windings of two phases. The illustration of FIG. 5 shows a winding scheme wherein a single stator winding coil, e.g. coils 24a and 24b, fits over each of the stator teeth, and the coil typically extends over most of the axial length of the stator tooth. As illustrated in FIGS. 5 and 6, the stator coils 24a, 24b are in a side-by-side arrangement in the stator slots. The stator coils 24a and 24b of adjacent stator teeth 40a and 40b, respectively, each typically occupy approximately ½ of the slot width and substantially the full slot depth that are available after allowance is made for sufficient insulation. However, the space available in practice is further reduced by the clearance realistically needed to insert or wind the coils. FIG. 5 illustrates that the sequencing of materials proceeding circumferentially around the stator is as follows:

1. first stator tooth 40a;
2. insulation 42;
3. first coil winding 24a (encircling first stator tooth 40a);
4. insulation 42;
5. second coil winding 24b (encircling second stator tooth 40b);
6. insulation 42; and
7. second stator tooth 40b.

The same sequence is found in the structure of FIG. 6. In both, the foregoing pattern is repeated around the stator circumference. A stacked coil configuration can be wound onto a stator for a radial airgap device that is formed conventionally of punched laminations that are stacked in registry, e.g. by needle winding.

The geometrical area of the stator slots that is not taken up by the windings is ordinarily occupied with potting, varnish, insulation, and the like, and is deemed waste area. The difference between the total area and the waste area is called the useful area. For an electric device having 54 slots of 4 mm width and an SPP ratio of 0.5, the percent of the useful space allocated to conducting windings varies is about 35%±10% when conventional stator coil winding and stacking techniques are employed and the machine is optimized for highest practical power density (i.e., power per unit volume, typically expressed in units of W/cm$^3$). These percentage values are given under the assumption of a constant fundamental frequency, and a constant ampere-turns applied to each stator tooth. With the same calculation, and under the same assumption, a different percentage of about 50%±10%, is found to optimize the torque per unit mass of active material.

The slot fill can reach up to about 65% of the available volume for a low pole count electric device wound with a conventional slot winding/filling scheme. The introduction of the low-loss materials into electric devices permits the design of high pole count, high slot count and high frequency electric devices with SPP=0.5. However, the minimum thickness of the insulation layers 42 is determined by the operating voltage of the electric device and as a result is relatively fixed.

Use of slot insulation, e.g. as illustrated by FIGS. 5–6, is established practice in the electrical machines arts. While stator windings normally are made with insulated wire, additional insulation such as Kraft paper or dielectric polymer film is ordinarily disposed on the bottom and sides of the stator slots to present abrasion or nicking of the windings due to contact with the stator, especially during winding or placement of the stator winding coils. Inter-phase insulation is also conventional. Dielectric failure at a damaged location can result in a hot spot or overheating and burnout of the windings. In extreme cases, failure can produce a shock or fire hazard.

In practice, high frequency machines frequently operate at higher voltages, thereby requiring thicker insulation 42. Higher voltages, especially at high frequency, often result in a corona effect, which is a catastrophic breakdown in insulation material in the presence of a strong field that is believed to ionize its constituent atoms, causing the insulator to become highly conductive. Therefore extra insulation is needed for high frequency devices, even further limiting the slot width available for windings. Using conventional coil arrangements and techniques, e.g. as illustrated in FIG. 6, as much as about 46% of the slot area is unavailable.

The stator winding coil fill of high slot count axial airgap electric devices can be greatly increased through use of the stator coil winding and stacking techniques of the present invention. In the embodiment of the present invention illustrated in FIG. 7, the stator slot fill exceeds 59% for a 4000-rpm electric device with 54 slots of 4 mm width. The slot fill would only be 46% if a conventional filling scheme were used in the same geometrical slot volume. An electric device with an increased slot fill of over 59% could exhibit a gain in performance of up to 28%, which is advantageous in the industry. The increase in possible slot filling provides more conductor area, which can be used to reduce winding resistance and thus ohmic losses. In addition, the larger conductor area allows the effective current density to be increased without otherwise changing the motor configuration. Higher current, in turn, permits a given design to be operated with increased machine power and torque.

Electric machines constructed in accordance with the present invention employ stacked windings. By "stacked windings" is meant a winding configuration in which a plurality of stator phase windings are disposed in a layered sequence from the tooth root and extending to a level near the tooth face. Inter-phase insulation is preferably disposed between the adjacent winding coils. The windings encircle one or more of the stator tooth sections. As used herein, the term "tooth root" refers to a location at the bottom of a tooth slot at the abutment of the tooth with the backiron. Although configurations with three or more stacked windings in each slot may be employed in the present machine, the benefits of stacked coils are ordinarily attainable with just two stacked windings.

Figure 7:
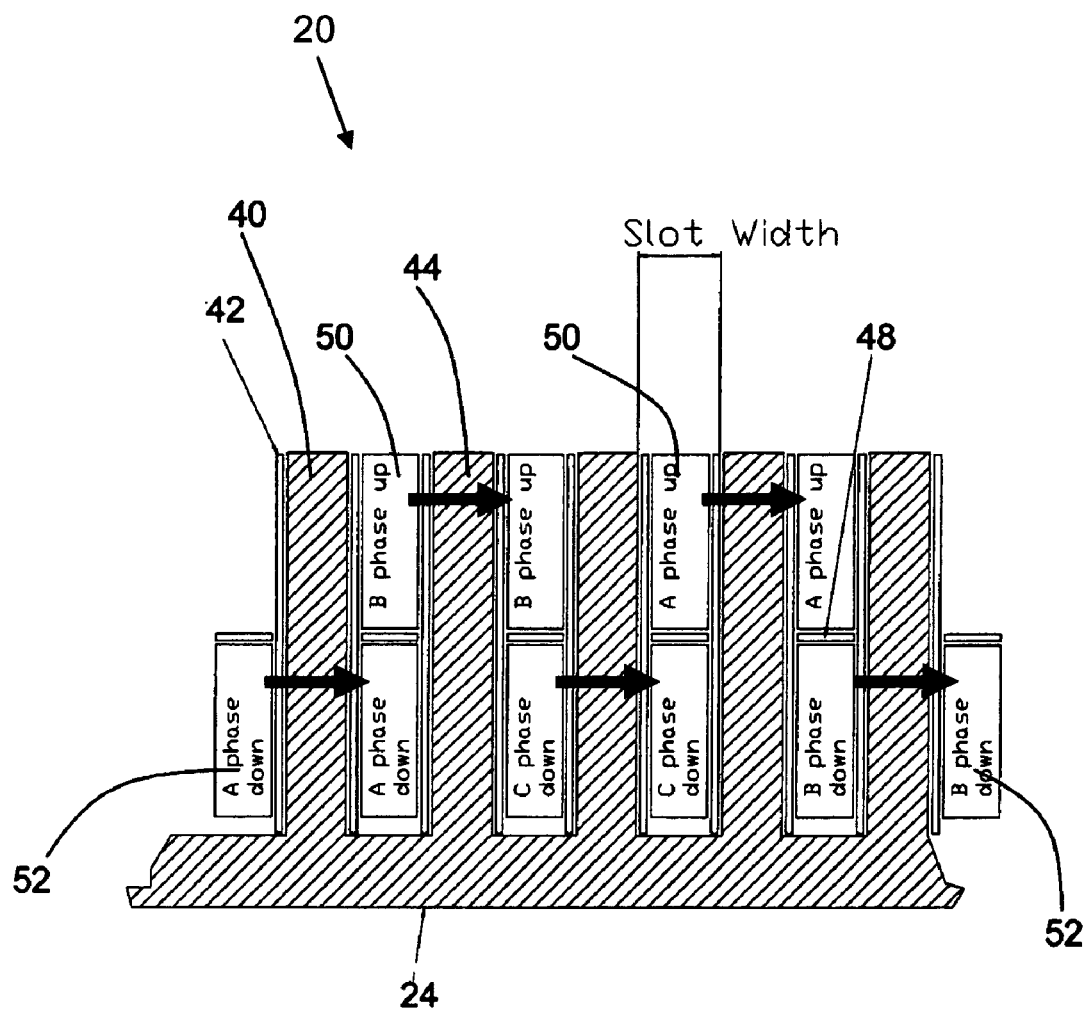
FIG. 7 illustrates a stator structure wound according to the present invention.
Figure 8:
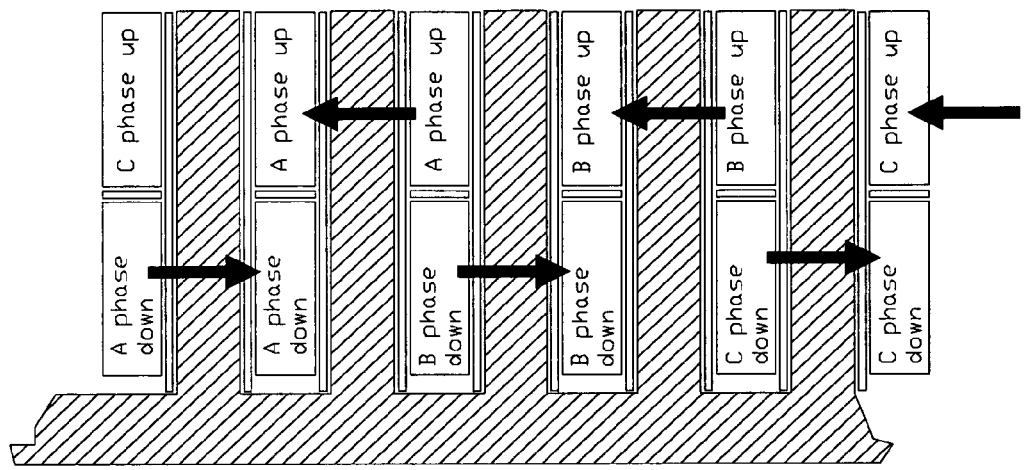
FIG. 8 illustrates another stator structure wound according to the present invention.
Figure 9:
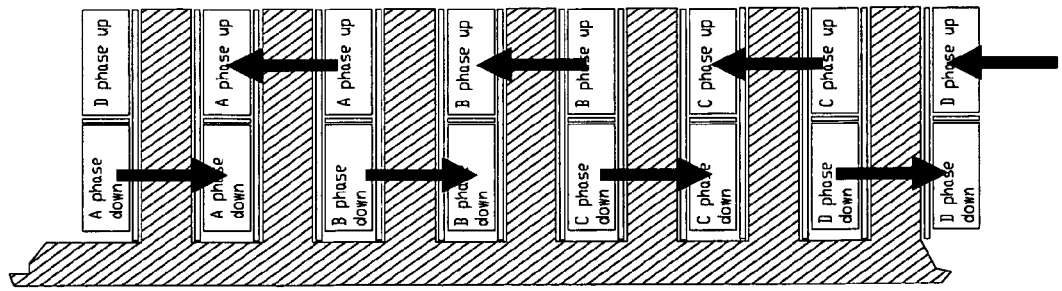
FIG. 9 illustrates a stator structure for a four-phase machine wound according to the present invention.
Figure 14:
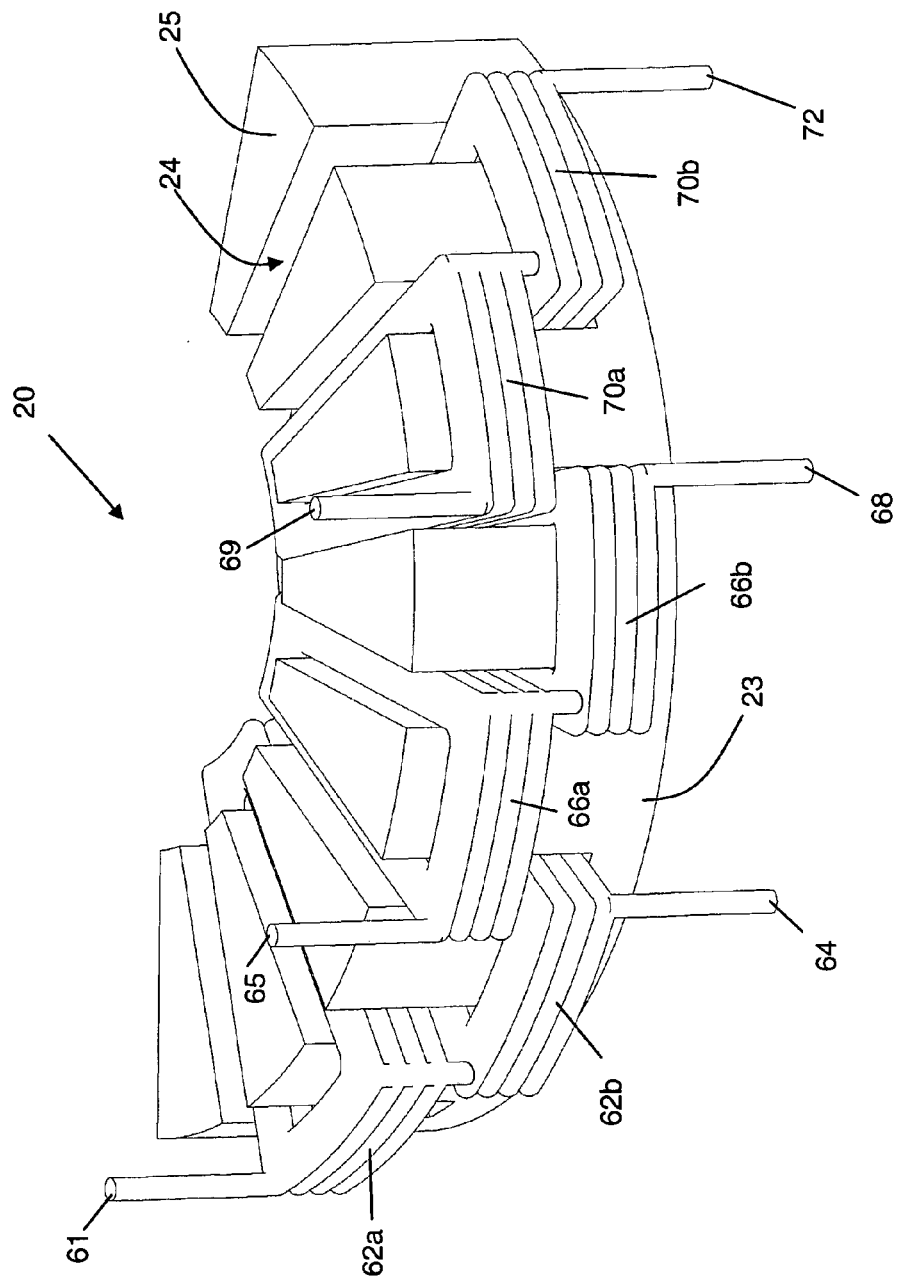
FIG. 14 illustrates in perspective view a portion of a stator coil connection arrangement corresponding to the stator coil configuration depicted by FIG. 8.

For example, FIG. 7 depicts a preferred configuration for a stator 20 for a three-phase axial airgap machine. As seen in FIG. 7, the stator slots are divided vertically, as illustrated instead of horizontally, as in the conventional arrangement of FIGS. 5–6. Each slot of the stator includes two windings, an up-coil 50 and a down-coil 52. Each coil occupies substantially the full available slot width, but only about half the available slot depth. As used herein with respect to stator coil winding configuration, "down" and "up" refer to the location of stator windings respectively beginning at the tooth root, and at about the mid-level of the slot and extending to near the free end of the tooth distal of the backiron. The respective coils 50 and 52 are wound around adjacent stator teeth 40 and 44, and are stacked on top of each other, as further illustrated in FIG. 7. Each phase of the three-phase system includes a plurality of up-coils 50 and down-coils 52. The stator coils are stacked in an alternating, sequential up/down pattern. In the embodiment depicted by FIG. 7, the windings are disposed in a pattern (A:down-B:up)(C:down-B:up)(C:down-A:up)(B:down-A:up) (B:down-C:up)(A:down-C:up)(A:down-B:up)(A:down-B:up). . ., wherein the letters A, B and C represent the three electrical phases and the representative nomenclature (A:down-B:up) designates a slot having a down-coil connected to the A phase and an up-coil connected to the B phase. The arrows in FIG. 7 represent the direction of current flow in the end turns connecting the turns on respective sides of each tooth. Other sequences are also possible. For example, FIG. 8 depicts a structure having a sequence (A:down-C:up)(A:down-A:up)(B:down-A:up)(B:down-B:up) (C:down-B:up)(C:down-C:up)(A:down-C:up). . . Arrows again represent the direction of current flow in the end turns. A perspective view showing a portion of a stator, including windings and the interconnection of the windings is shown by FIG. 14. In particular, stator 20, comparable to the stator of FIG. 8, includes a plurality of teeth 25 depending from backiron 23. Between each pair of adjacent teeth 25 is a slot 24. Windings 62, 66, and 70 are respectively associated with phases A, B and C. Up-coil 62a and down-coil 62b are series-connected and energized by phase A at ends 61 and 64. Similarly up-coils 66a and 70a, and series-connected down-coils 66b and 70b are eneralzed by phase B and phase C at ends 65 and 68, and 69 and 72, respectively. The layers of insulation or dielectric material are interspersed between the stator coils and the stator teeth in two different orientations. Insulation layer 42 conventionally orientation covers the side walls and bottom of the slots, while inter-phase insulation layer 48 is oriented perpendicular to the conventional orientation, and thus is substantially parallel to the bottom of the slot. This configuration allows for higher slot fill of stator coil windings. As a result of implementing the techniques of the present invention, the device designer can achieve increased power or increased efficiency through the increase in stator slot fill. A variety of similar stator configurations are also useful for polyphase devices with other than three phases. For example, one possible sequence for a four-phase device is depicted by FIG. 9 and is denoted by (A:down-D:up)(A:down-A:up) (B:down-A:up)(B:down-B:up)(C:down-B:up) (C:down-C:up)(D:down-C:up)(D:down-D:up) (A:down-D:up). . ., with the end turn current flow as shown by arrows.

Part of the reduction in insulation volume provided by the present configuration arises from simple geometric considerations. Comparing the disposition of insulation in the FIG. 6 prior art device and the present machine depicted in FIG. 7, both configurations require substantially the same insulation on the slot walls and bottom, but different insulation intermediate the adjacent phase windings. In the FIG. 6 configuration, the intermediate insulation is vertical and has a volume given approximately by T·(D−d)·s, wherein "s" is the nominal insulation thickness. On the other hand, the horizontal intermediate insulation seen in FIG. 7 has an approximate volume w·(D−d)·s. Since tooth height T is generally twice or more slot width w in preferred designs, the volume of inter-phase insulation is halved by the present configuration.

However, manufacturing considerations play an additional, and generally even more significant role in the improvement in slot utilization afforded by the present stacked-coil configuration. A kraft paper commonly used for slot insulation in motor construction is 6 mils (0.15 mm) thick. However, an additional lateral space, often as much as 30 mils (0.75 mm), is needed to provide enough clearance for the winding operation with side-by-side coils used in the FIG. 6 device. That amount substantially impacts the realistically available area, especially for the narrow slots typical in high slot-count designs. Although the additional clearance is required just during the actual phase winding, it cannot generally be recovered thereafter. By way of contrast, such an extra allowance is not needed for winding the present stacked coils. Moreover, after the down coil is wound, any residual space associated with the insulation frequently can be substantially eliminated by compression before the up coil is wound.

Ordinarily, an inexpensive, highly conducting wire such as Cu or Al wire is preferred for the stator windings, but materials and forms may also be used, including other metals and alloys and superconductors. The wire may have any cross-section, but round and square wires are most common. In certain high frequency applications, stranded wires or Litz wire may be advantageous. A preferred winding scheme entails one coil per tooth 25. Each coil ordinarily comprises multiple turns of conductive wire. However, any winding arrangement known in the art is applicable. The windings may be formed in place around the teeth, or they may be separately prepared as an assembly and slipped over the tooth ends.

The stator assembly 20, along with stator windings, can be placed in a stator carrier (not shown). Preferably the stator assembly is potted within the stator carrier using an appropriate organic dielectric, such as one that does not induce excessive stress in the stator magnetic material. While the stator carrier is preferably non-magnetic, there is no restriction on the conductivity of the stator carrier material. Factors that can influence the choice of stator carrier material include required mechanical strength and thermal properties. Any appropriate material able to properly support the stator assembly may be used as a stator carrier. In a specific embodiment, the stator carrier is formed from aluminum.

Inductance of the Stator Up-Coils and Down-Coils

The ideal inductance "L" of a coil is calculated as:

$$L = N^2 \cdot P \tag{1}$$

wherein

L=coil self-inductance,

N=number of turns per coil,

P=magnetic circuit permeance.

The permeance "P" is defined as:

$$P = \mu_o \cdot \mu_r \cdot A/l \qquad (2)$$

wherein $\mu_r$=relative permeability of magnetic circuit, $\mu_o$=permeability of air, A=cross section of magnetic circuit, l=path length of magnetic circuit.

Equation 2 is very difficult to calculate accurately for other than the simplest of coil geometries. While N can be kept the same for both the up- and down-coils of the invention, a device designer has to make approximations for A, l, and $\mu_r$, which are not uniquely specified for an open magnetic circuit, and especially not for a circuit with a complicated geometry.

Each of the present stator coil windings has an associated geometry-dependent inductance. In particular, a qualitative consideration of Equation (2) indicates that the difference in fringing flux patterns makes the inductance of the up and down coils different.

Figure 10:
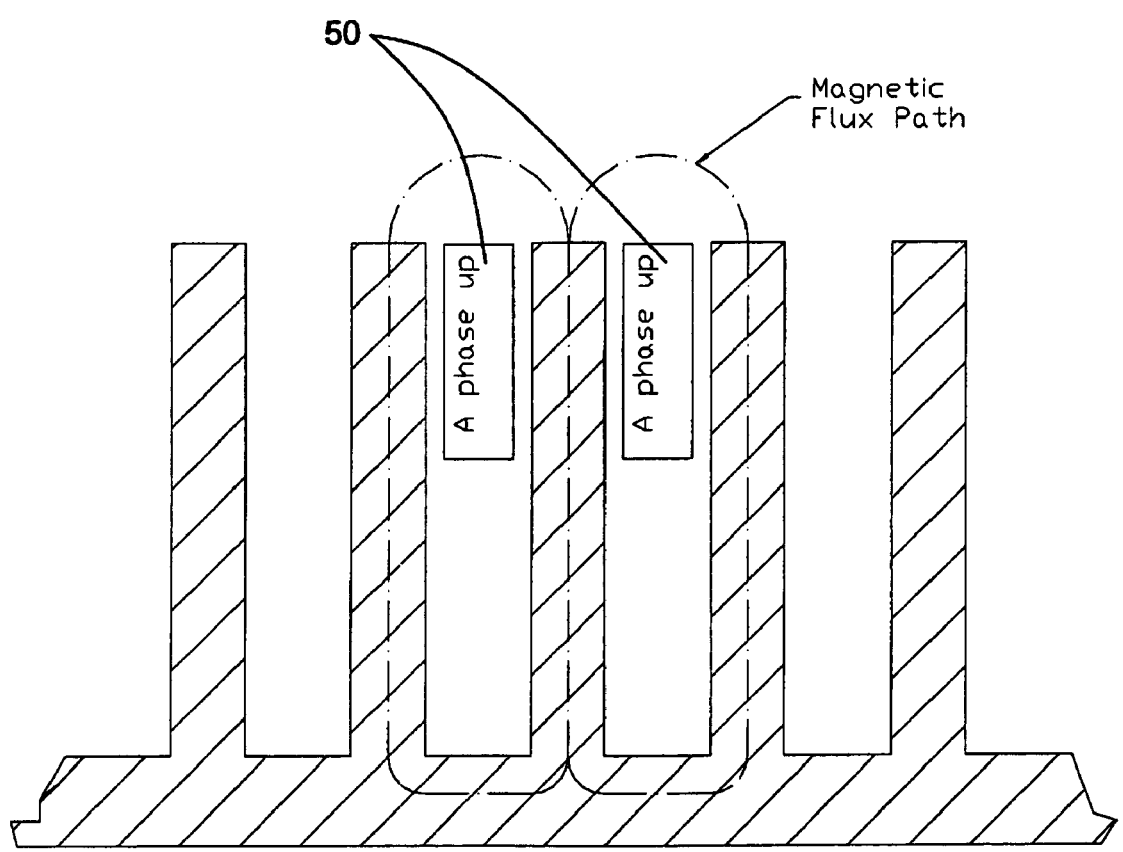
FIG. 10 illustrates primary magnetic flux paths for an up-coil of a stator structure wound according to the present invention.
Figure 11:
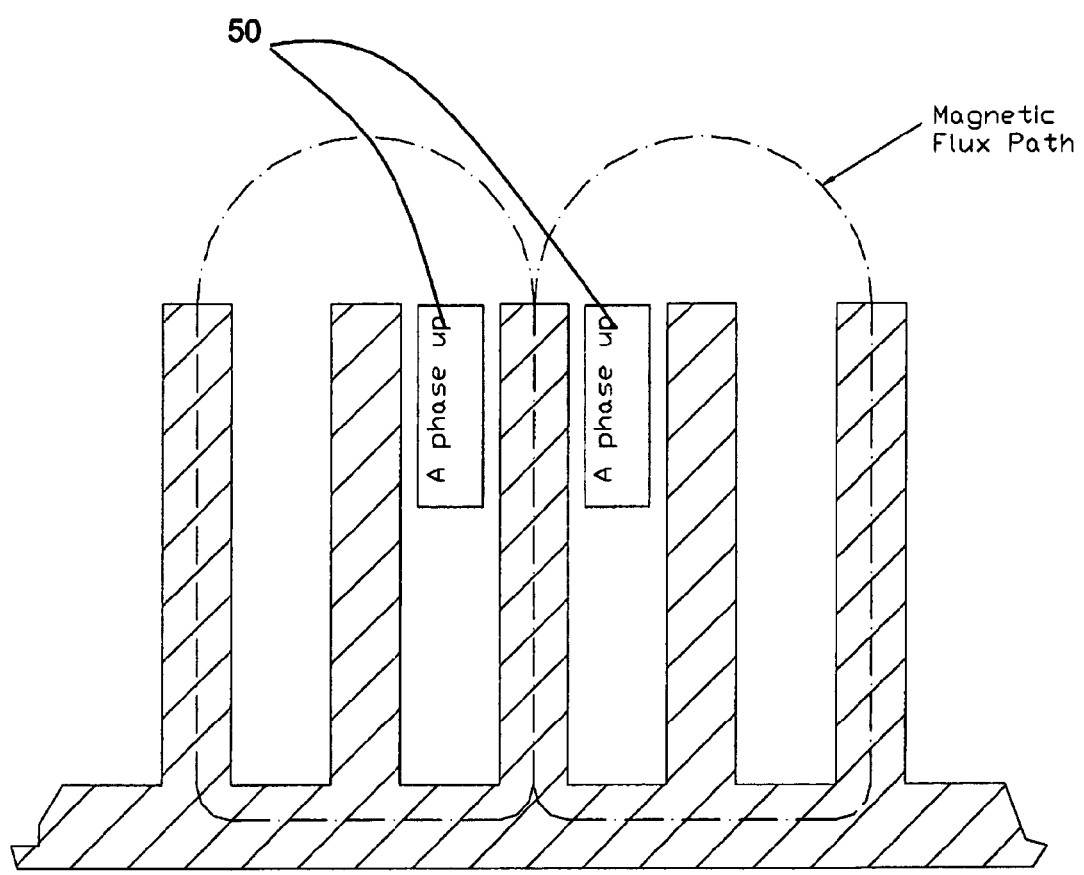
FIG. 11 illustrates secondary magnetic flux paths for an up-coil of a stator structure wound according to the present invention.

For the up-coil, the effective coil magnetic flux area A includes the stator core area for the length of the tooth. Progressing to the backiron, the coil magnetic flux area is the backiron cross-sectional area, and then to a second tooth with its respective core area, and finally the approximated area of the air gap. The length t of the circuit is approximately the aggregate of the core length, the distance spanned from tooth to tooth through the backiron in two directions, the length of the adjacent teeth, and then the approximated length of the magnetic flux through air, as illustrated in FIG. 10. There are also other magnetic flux paths as illustrated in FIG. 11, which travel through stator cores farther and farther away, however, they have less impact on the inductance calculations. The value of $\mu_r$ in the airgap can be approximated as the value in free space, i.e. 1.0. Any practical soft magnetic material has $\mu_r$ at at least $10^3$, and often substantially higher, so that the permeance is dominated by the air gap. Hence, a practical calculation can take into account the magnetic path through air only. As a result, Equation (2) for the up-coil is approximated by:

$$L = \mu_o \cdot N^2 \cdot A/l \qquad (3)$$

Figure 12:
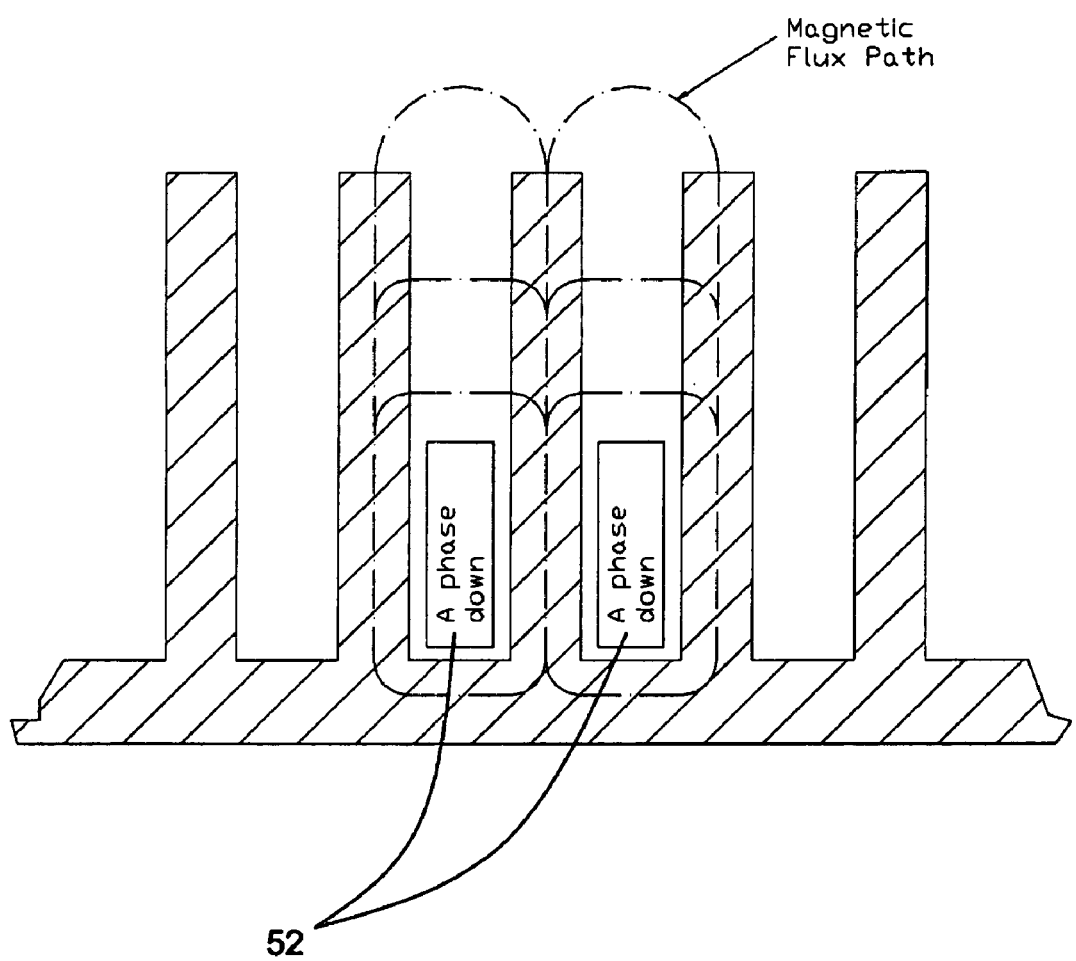
FIG. 12 illustrates primary magnetic flux paths of a down-coil of an electric device wound according to the present invention.

For the down coil, the effective area of the air gap is increased by a factor f which is significantly greater than 1.0. This is due to the propensity of part of the total magnetic flux to cross the slot width, as illustrated in FIG. 12. For similar reasons, the effective length of the air gap is lowered by a factor g less than 1.0. As a result, Equation (2) for the down-coil is approximated by:

$$L = \mu_o \cdot N^2 \cdot (A \cdot f)/(l \cdot g) \qquad (4)$$

As a result, the down-coil ordinarily has a much higher inductance than the up-coil.

Inductance in a circuit carrying alternating current produces reactance, and reactance combined with resistance produces impedance. An electrical current will flow "circularly" within a phase for any electric device having coils wound in parallel, if there is any difference in impedance between the coils. These "circulating currents" are very detrimental to a device performance. They do no useful work and detract from the output power of the device, while at the same time adding ohmic losses to the machine.

In one aspect, the present invention provides a solution to the problem of circulating currents, wherein the relative number of turns N of the up-coil and the down-coil are modified. The desired values of N for the coils can be determined mathematically by setting the inductances of the up- and down-coil to be equal. However, changing the number of turns per coil modifies both the relative resistances of the up- and down-coils and the back-EMF (electromotive force) constant per up- or down-coil. Since the overall impedance is of interest, a difference in resistance also cause potential circulating currents. The difference in resistance can be compensated by using different wire sizes. The difference in back-EMF constant can also be a cause of circulating currents, but it cannot be corrected by changing the wire size.

In a preferred embodiment of the invention, the problem of circulating currents is instead solved by series-wiring every up-coil to a corresponding down-coil. The series winding of down-coils with up-coils, on a matching one-one basis, substantially reduces or eliminates the unwanted circulating currents. While the series connection ordinarily suffices by itself, the foregoing adjustment of wire size and number of turns can be used adjunctly.

Low Loss Stator Materials

The incorporation of amorphous, nanocrystalline, or optimized Fe-based alloy, or grain-oriented or non-grain-oriented Fe-based material in preferred embodiments of the present electrical machine enables the machine's commutating frequency to be increased above 400 Hz with only a relatively small increase in core loss, as compared to the unacceptably large increase that would be seen in conventional machines. The use of the low-loss materials in the stator core accordingly allows the development of high-frequency, high pole count, electric devices capable of providing increased power density, and improved efficiency. Furthermore, decreases in stator core loss also allow a motor to be operated well past a conventional base speed without the need for torque and power derating frequently necessitated by thermal limits in conventionally designed machines. Preferably the stator assembly comprises laminated layers composed of at least one material selected from the group consisting of amorphous, nanocrystalline, or optimized Fe-based alloy.

Amorphous Metals

Amorphous metals exist in many different compositions suitable for use in the present motor. Metallic glasses are typically formed from an alloy melt of the requisite composition that is quenched rapidly from the melt, e.g. by cooling at a rate of at least about $10^{6\circ}$ C./s. They exhibit no long-range atomic order and have X-ray diffraction patterns that show only diffuse halos, similar to those observed for inorganic oxide glasses. A number of compositions having suitable magnetic properties are set forth in U.S. Patent No. RE32,925 to Chen et al. Amorphous metal is typically supplied in the form of extended lengths of thin ribbon (e.g. a thickness of at most about 50 μm) in widths of 20 cm or more. A process useful for the formation of metallic glass strips of indefinite length is disclosed by U.S. Pat. No. 4,142,571 to Narasimhan. An exemplary amorphous metal material suitable for use in the present invention is MET-GLAS® 2605 SA1, sold by Metglas, Inc., Conway, S.C. in the form of ribbon of indefinite length and up to about 20 cm wide and 20–25 μm thick (see http://www.metglas.com/products/page5_1_2_4.htm). Other amorphous materials with the requisite properties may also be used.

Amorphous metals have a number of characteristics that must be taken into account in the manufacture and use of magnetic implements. Unlike most soft magnetic materials, amorphous metals (also known as metallic glasses) are hard and brittle, especially after the heat treatment typically used to optimize their soft magnetic properties. As a result, many of the mechanical operations ordinarily used to process conventional soft magnetic materials for motors are difficult or impossible to carry out on amorphous metals. Stamping, punching, or cutting as-produced material generally results in unacceptable tool wear and is virtually impossible on brittle, heat-treated material. Conventional drilling and welding, which are often done with conventional steels, are also normally precluded.

In addition, amorphous metals exhibit a lower saturation flux density (or induction) than conventional Si—Fe alloys. The lower flux density ordinarily results in lower power densities in motors designed according to conventional methods. Amorphous metals also have lower thermal conductivities than Si—Fe alloys. As thermal conductivity determines how readily heat can be conducted through a material from a warm location to a cool location, a lower value of thermal conductivity necessitates careful design of the motor to assure adequate removal of waste heat arising from core losses in the magnetic materials, ohmic losses in the windings, friction, windage, and other loss sources. Inadequate removal of waste heat, in turn, would cause the temperature of the motor to rise unacceptably. Excessive temperature is likely to cause premature failure of electrical insulation or other motor components. In some cases, the over-temperature could cause a shock hazard or trigger catastrophic fire or other serious danger to health and safety. Amorphous metals also exhibit a higher coefficient of magnetostriction than certain conventional materials. A material with a lower coefficient of magnetostriction undergoes smaller dimensional change under the influence of a magnet field, which in turn would likely reduce audible noise from a machine, as well as render the material more susceptible to degradation of its magnetic properties as the result of stresses induced during machine fabrication or operation.

Despite these challenges, an aspect of the present invention provides a motor that successfully incorporates advanced soft magnetic materials and permits motor operation with high frequency excitation, e.g., a commutating frequency greater than about 400 Hz. Construction techniques for the fabrication of the motor are also provided. As a result of the configuration and the use of advanced materials, especially amorphous metals, the present invention successfully provides a motor that operates at high frequencies (defined as commutating frequencies greater than about 400 Hz) with a high pole count. The amorphous metals exhibit much lower hysteresis losses at high frequencies, which result in much lower core losses. Compared to Si—Fe alloys, amorphous metals have much lower electrical conductivity and are typically much thinner than ordinarily used Si—Fe alloys, which are often 200 µm thick or more. Both these characteristics promote lower eddy current core losses. The invention successfully provides a motor that benefits from one or more of these favorable attributes and thereby operates efficiently at high frequencies, using a configuration that permits the advantageous qualities of the amorphous metal, such as the lower core loss, to be exploited, while avoiding the challenges faced in previous attempts to use advanced materials.

Nanocrystalline Metals

Nanocrystalline materials are polycrystalline materials with average grain sizes of about 100 nanometers or less. The attributes of nanocrystalline metals as compared to conventional coarse-grained metals generally include increased strength and hardness, enhanced diffusivity, improved ductility and toughness, reduced density, reduced modulus, higher electrical resistance, increased specific heat, higher thermal expansion coefficients, lower thermal conductivity, and superior soft magnetic properties. Nanocrystalline metals also have somewhat higher saturation induction in general than most Fe-based amorphous metals.

Nanocrystalline metals may be formed by a number of techniques. One preferred method comprises initially casting the requisite composition as a metallic glass ribbon of indefinite length, using techniques such as those taught hereinabove, and forming the ribbon into a desired configuration such as a wound shape. Thereafter, the initially amorphous material is heat-treated to form a nanocrystalline microstructure therein. This microstructure is characterized by the presence of a high density of grains having average size less than about 100 nm, preferably less than about 50 nm, and more preferably about 10–20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of a device comprising the component. The heat treatment needed to produce the nanocrystalline structure in a given alloy must be carried out at a higher temperature or for a longer time than would be needed for a heat treatment designed to preserve therein a substantially fully glassy microstructure. Preferably, the nanocrystalline metal is an iron-based material. However, the nanocrystalline metal could also be based on or include other ferromagnetic materials, such as cobalt or nickel. Representative nanocrystalline alloys suitable for use in constructing magnetic elements for the present device are known, e.g. alloys set forth in U.S. Pat. No. 4,881,989 to Yoshizawa and U.S. Pat. No. 5,935,347 to Suzuki et al. Such materials are available from Hitachi Metals, Vacuumschmelze GmbH, and Alps Electric. An exemplary nanocrystalline metal with low-loss properties is Hitachi Finemet FT-3M. Another exemplary nanocrystalline metal with low-loss properties is Vacuumschmelze Vitroperm 500 Z.

Optimized Fe-Based Alloys

The present machines may also be constructed with optimized, low-loss Fe-based crystalline alloy material. Preferably such material has the form of strip having a thickness of less than about 125 µm, much thinner than the steels conventionally used in motors, which have thicknesses of 200 µm or more, and sometimes as much as 400 µm or more. Both grain-oriented and non-oriented materials may be used. As used herein, an oriented material is one in which the principal crystallographic axes of the constituent crystallite grains are not randomly oriented, but are predominantly correlated along one or more preferred directions. As a result of the foregoing microstructure, an oriented strip material responds differently to magnetic excitation along different directions, whereas a non-oriented material responds isotropically, i.e., with substantially the same response to excitation along any direction in the plane of the strip. Grain-oriented material is preferably disposed in the present motor with its easy direction of magnetization substantially coincident with the predominant direction of magnetic flux.

As used herein, conventional Si—Fe refers to silicon-iron alloys with a silicon content of about 3.5% or less of silicon by weight. The 3.5 wt. % limit of silicon is imposed by the industry due to the poor metalworking material properties of Si—Fe alloys with higher silicon contents. The core losses of the conventional Si—Fe alloy grades resulting from operation at a magnetic field with frequencies greater than about 400 Hz are substantially higher than those of low loss material. For example, in some cases the losses of conventional Si—Fe may be as much as 10 times those of suitable amorphous metal at the frequencies and flux levels encountered in machines operating under frequency and flux levels of the present machines. As a result, in many embodiments conventional material under high frequency operation would heat to a point at which a conventional machine could not be cooled by any acceptable means. However, some grades of silicon-iron alloys, herein referred to as optimized Si—Fe, are directly applicable to producing a high-frequency machine.

The optimized Fe-based alloys useful in the practice of the present invention include silicon-iron alloy grades comprising greater than 3.5% of silicon by weight, and preferably more than 4%. The non-grain-oriented Fe-based material used in constructing machines in accordance with the invention preferably consists essentially of an alloy of Fe with Si in an amount ranging from about 4 to 7.5 wt. % Si. These preferred alloys have more Si than conventional Si—Fe alloys. Also useful are Fe—Si—Al alloys such as Sendust.

More preferred non-oriented optimized alloys have a composition consisting essentially of Fe with about 6.5±1 wt. % Si. Most preferably, alloys having about 6.5% Si exhibit near-zero values of saturation magnetostriction, making them less susceptible to deleterious magnetic property degradation due to stresses encountered during construction or operation of a device containing the material.

The objective of the optimization is to obtain an alloy improved magnetic properties, including reduced magnetostriction and especially, lower core losses. These beneficial qualities are obtainable in certain alloys with increased silicon content made by suitable fabrication methods. In some cases, these optimized Si—Fe alloy grades are characterized by core losses and magnetic saturation similar to those of amorphous metal. However, alloys containing more than about 4 at. % Si are difficult to produce by conventional means because of their brittleness due to short-range ordering. In particular, conventional rolling techniques used to make conventional Si—Fe are generally incapable of making optimized Si—Fe. However, other known techniques are used to make optimized Si—Fe.

For example, one suitable form of Fe-6.5 Si alloy is supplied as magnetic strips 50 and 100 μm thick by the JFE Steel Corporation, Tokyo, Japan (see also http://wwwjfe-steel.co.jp/en/products/electrical/supercore/index.html). Fe-6.5% Si produced by rapid solidification processing, as disclosed by U.S. Pat. No. 4,865,657 to Das et al. and U.S. Pat. No. 4,265,682 to Tsuya et al., also may be used. Rapid solidification processing is also known for preparing Sendust and related Fe—Si—Al alloys.

Loss Behavior of Preferred Soft Magnetic Materials

A major contribution to the improved losses in the materials preferred for the present stator results from significantly reduced hysteresis losses. As is known in the art, hysteresis losses result from impeded domain-wall motion during the magnetization of all soft magnetic materials. Such losses are generally higher in conventionally used magnetic materials, such as conventional grain-oriented Si—Fe alloys and non-oriented motor and electrical steels, than in the improved materials preferably employed in the present machines. High losses, in turn, can contribute to the overheating of the core.

More specifically, it is found that the core loss of soft magnetic materials can generally be expressed by the following modified Steinmetz equation:

$$L = a \cdot f \cdot B^b + c \cdot f^d \cdot B^e \quad (5)$$

wherein:
L is the loss in W/kg,
f is the frequency in kHz,
B is the magnetic flux density in peak Tesla, and
a, b, c, and d and e are all empirical loss coefficients specific to any particular soft magnetic material.

Each of the above loss coefficients a, b, c, d and e, can generally be obtained from the manufacturer of a given soft magnetic material. Especially preferred for use in the present stator structure are low core loss magnetic materials characterized by a core loss less than "L" where L is given by a form of Equation (5), in which $L = 12 \cdot f \cdot B^{1.5} + 30 \cdot f^{2.3} \cdot B^{2.3}$.

Rotor Structure

Figure 3A:
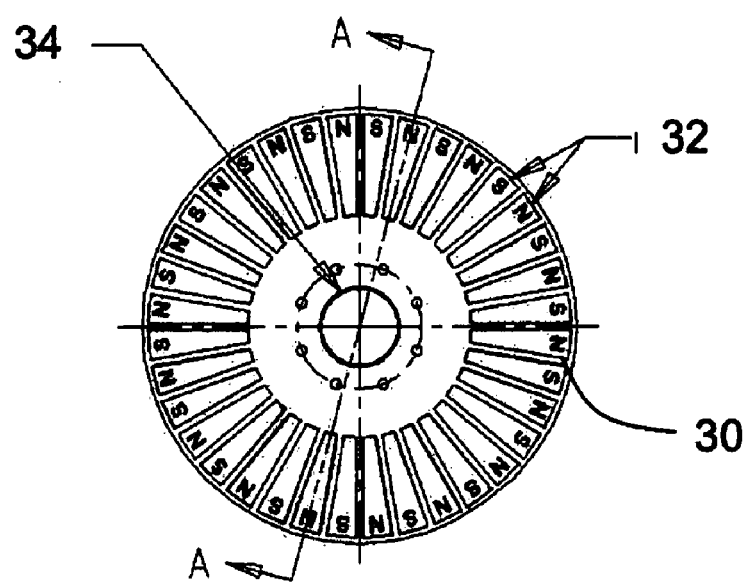
FIGS. 3A and 3B illustrate top and side views, respectively, of a rotor structure of the invention, showing the location and polarity of the rotor magnets.
Figure 3B:
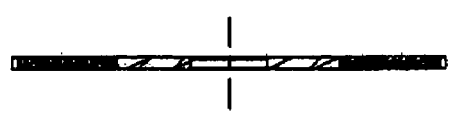

In a further aspect of the present invention there is provided an axial airgap, brushless, permanent magnet electric device, wherein a rotor structure is placed adjacent to the stator body on a common axis. FIGS. 3A and 3B illustrate a top and side view, respectively, of an axial rotor 30 suitable for the present machine. FIG. 3A illustrates a plurality of magnets 32 possessing alternating polarity positioned about the rotor. The magnets possess alternating polarity and are securely positioned circumferentially about the rotor with substantially equal spacing. Different parameters of the rotor magnets, such as size, position, angle, skew, shape, and the like, are selected to achieve the desired performance. FIG. 3B illustrates a side view of the rotor taken along line A of FIG. 3A.

Alternatively, the permanent magnet rotor assembly can take any form that secures the magnets for rotation in proximity to the faces of the stator teeth. For example, the rotor magnets 32 can be set into, or mounted onto, a rotor carrier. The rotor assembly can include any number of rotor magnets 32. In some embodiments, the rotor magnets extend through the thickness of the rotor, while in others, they do not.

The magnets can be spaced such that there is little or no circumferential clearance between alternating magnets. It is preferable that the spacing between the magnets be selected to have an optimum value, which also minimizes the occurrence of torque cogging. An optimum spacing is derived from first dividing the low-loss metal area of the stator by the number of stator slots to get the area of each single metal core tooth. The optimum spacing between the magnets will then be such that the total area of each magnet equals 175±20% of the area of a core tooth.

Figure 4:
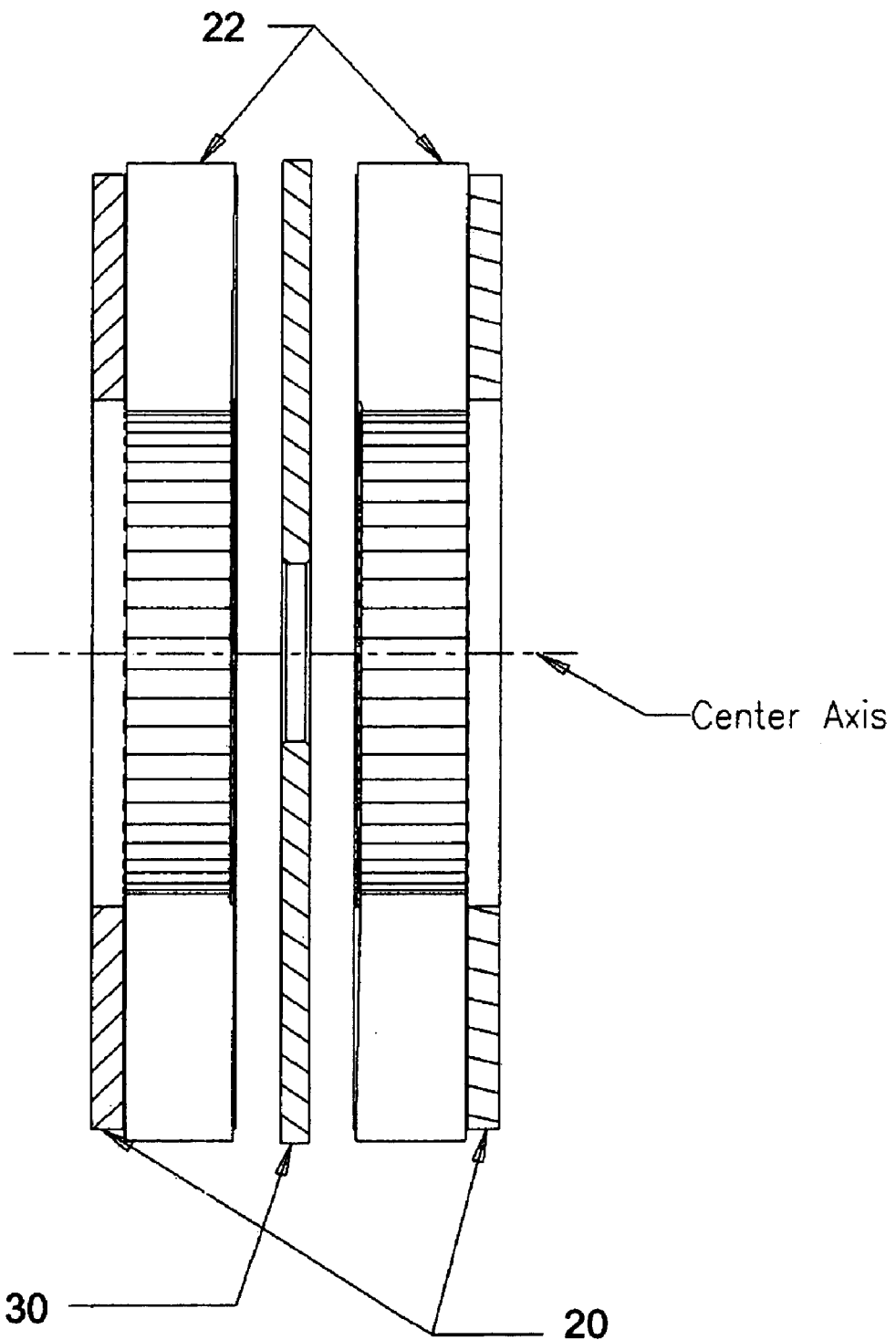
FIG. 4 illustrates an arrangement of the stators and the rotor therebetween for an axial airgap-type electric device of the invention.

FIG. 4 illustrates a side view of an embodiment of the electric device which includes two stators positioned in an axial-type arrangement on either side of, and along a common center axis with a single rotor, which serves both stators 20. In a specific embodiment, an electric device including amorphous metal stators on either side of a single rotor is found to exhibit a high power density. Such a configuration beneficially reduces axial thrust on the rotor, since the attraction between the rotor and the respective stators is oppositely directed and substantially offset.

Although the rotor magnets have been described as permanent magnets, alternate embodiments of the present machine employ other types of magnetic material or electromagnets. For example, an induction machine may employ laminated soft magnetic material, while a switched reluctance machine may have a solid iron rotor.

Rotor Materials

Any type of permanent magnet can be used in the present rotor. Rare earth-transition metal alloy magnets such as samarium-cobalt magnets, other cobalt-rare earth magnets, or rare earth-transition metal-metalloid magnets, e.g., NdFeB magnets, are especially suitable. Alternatively, the rotor magnet structure comprises any other sintered, plastic-bonded, or ceramic permanent magnet material. Preferably, the magnets have high maximum BH energy product, high coercivity, and high saturation magnetization, along with a linear second-quadrant normal demagnetization curve. More preferably, oriented and sintered rare earth-transition metal alloy magnets are used, since their higher energy product increases flux and hence torque, while allowing the volume of expensive permanent magnet material to be minimized.

Preferably, the rotor arrangement comprises a disk or axial type rotor assembly including circumferentially spaced-apart, high energy product permanent magnets, such as rare earth-transition metal (e.g., SmCo) or rare earth-transition metal-metalloid magnets (e.g., NdFeB and NdFe-CoB), each having opposite ends defining north and south poles. As best seen in FIGS. 3A and 3B, rotor 30 and its magnets 32 are supported for rotation about a motor axis, e.g., on a shaft 34 or any other suitable arrangement such that the poles of the magnets are accessible along a predetermined path adjacent the one or more stator assemblies. Ordinarily the shaft is supported by bearings of any suitable type known for rotating machines. The magnet area on the rotor has an outer diameter and an inner diameter. In a preferred embodiment, for an axial airgap type rotor, the outer diameter and inner diameter of the magnets 32 are substantially identical to those of the stator assemblies 20. If the outer diameter of the magnets 32 is greater than that of the stator tooth sections 21, then the outer portion of the rotor does not contribute appreciably to performance. If the outer diameter of the rotor is smaller than that of the stator tooth sections 21, the result is a reduction in performance of the electric device. In either case, some of the hard or soft magnetic material present in the machine increases cost and weight, but without improving performance. In some cases, the extra material even diminishes performance of the machine.

Slot Per Phase Per Pole Ratios

The slot per phase per pole (SPP) value of an electric machine is determined by dividing the number of stator slots by the number of phases in the stator winding and the number of DC poles (SPP=slots/phases/poles). In the present description, a pole refers to the non-time-varying magnetic field, also referred to herein as a DC field, which interacts with a changing magnetic field, i.e., one that varies in magnitude and direction with both time and position. In the preferred embodiments, permanent magnets mounted on the rotor provide the DC field, and hence the number of non-time-varying magnetic poles, referred to herein as DC poles. In other embodiments, a DC electromagnet can provide the rotor DC field. The electromagnets of the stator windings provide the changing magnetic field. A slot refers to the spacing between alternating teeth of the stator of the present machine. The techniques of the present invention are applicable to electric devices with any SPP value. Beneficially, the design of the present machine affords considerable flexibility in the selection of an optimal SPP ratio.

Conventional machines are frequently designed to have an SPP ratio of 1 to 3 to obtain acceptable functionality and noise levels and to provide smoother output due to better winding distribution. However, designs with a lower SPP value, e.g. 0.5, have been sought to reduce the effect of end turns. End turns are the portions of wire in the stator coils that connect the windings between slots. Although such connection is, of course, required, the end turns do not contribute to the torque and power output of the machine. In this sense they are undesirable, because they increase the amount of wire required and contribute ohmic losses to the machine while providing no benefit. Hence, one goal of the motor designer is to minimize end turns and provide a motor with manageable noise and cogging. On the other hand, preferred implementations of the present motor allow reduced SPP ratio, along with desirably low noise, cogging, and power electronics ripple described in greater detail hereinbelow. Such a benefit is obtained by operating with a high pole and slot count. These options were not viable in previous machines, because the required increase in commutating frequency is unacceptable without the use of advanced, low loss stator materials.

For some applications, it is advantageous to build a motor with a fractional value of SPP, since such a motor may employ pre-formed coils disposed around a single stator tooth. In different embodiments of the present machine, the SPP ratio is an integral ratio, such as 0.25, 0.33, or 0.5. For example, the four-phase embodiment of FIG. 9 has SPP=0.33. SPP values of 1.0, or even greater than 1.0, are also possible. Preferably, SPP values range from about 0.25 to 4.0. However, more preferred embodiments of the present machine are beneficially designed with an SPP ratio of 1 or less, and even more preferably 0.5 or less. It is possible to wire multiple slots into a common magnetic section, thereby providing an SPP greater than 0.5. This is the result of there being a greater number of stator slots than rotor poles, resulting in a distributed winding. A value of SPP less than or equal to 0.5 indicates that there are no distributed windings. A convention in the industry is to include distributed windings in the stator. Ordinarily, prior art machines designed with distributed windings have many slots per pole, resulting in lower frequency operation. As a result, in conventional machines that have SPP of 0.5 or less, and operate at low frequency, there will also be a low pole count and high, difficult to control cogging. On the other hand, the use of advanced magnetic materials in the present machine permits the commutating frequency to be raised, so that low SPP values can be maintained, while still minimizing cogging and without reducing the machine speed. However, while the methods of the present invention are applicable to an electric device with SPP values below 0.5 (e.g. 0.25), such a configuration sometimes is made less desirable by practical considerations, including increased machine reactance at the higher commutating frequency required, somewhat increased leakage flux from the rotor magnets, and the mechanical support needed to accommodate the rotor magnets which are smaller and numerous. A low SPP value often is less advantageous for other important parameters of the electric device as well.

On the other hand, increasing the SPP value effectively increases the pole pitch of the machine. For example, multiple stator slots can be wired into a common magnetic section, which corresponds to a slot per phase per pole (SPP) value greater than 0.5.

Although the present machine may be designed and operated as a single-phase device, or a polyphase device with any number of phases and a commensurate number of windings on each of the stators, a three-phase machine with three-phase windings is preferred in accordance with industry convention, as it provides efficient utilization of both hard and soft magnetic materials, along with good power density. Embodiments with SPP ratios of 0.5 are particularly suited for three-phase applications. For example, in a three-phase machine, with SPP=0.5, the number of rotor poles is two-thirds the number of stator slots, with the number of slots being a multiple of the number of phases. While the machine is usually wired in three-phase wye configuration in accordance with industry convention, a delta-configuration may also be employed. In a preferred embodiment provided by the present invention, the stacked coil stator winding configuration is especially applicable to an electric device with an SPP value optimally equal to 0.5.

High Pole Count High-Frequency Design Using Low Loss-Materials

The present structure and method are applicable to electric devices having a pole count ranging from low to high. However, the benefits of the present stacked slot winding configuration are especially realized in embodiments wherein the use of low-loss materials in the stator permits design of high pole count electric devices that operate at high frequencies. In specific embodiments, the present invention provides an axial airgap electric device with a high pole count that operates at high frequencies, i.e., a commutating frequency greater than about 400 Hz. In some cases, the device is operable at a commutating frequency ranging from about 500 Hz to 3 kHz or more. Designers ordinarily have avoided high pole counts for high speed motors, since conventional stator core materials, such as Si—Fe, cannot operate at the proportionately higher frequencies necessitated by the high pole count. In particular, known devices using Si—Fe cannot be switched at magnetic frequencies significantly above 400 Hz due to core losses resulting from changing magnetic flux within the material. Above that limit, core losses cause the material to heat to the point that the device cannot be cooled by any acceptable means. Under certain conditions, the heating of the Si—Fe material may even be severe enough that the machine cannot be cooled whatsoever, and will self-destruct. However, it has been determined that the low-loss characteristics of suitable amorphous, nanocrystalline and optimized Fe-based metals allow much higher switching rates than possible with conventional Si—Fe materials. While, in a preferred embodiment, the choice of amorphous metal alloy, such as METGLAS® 2605SA1 alloy, removes the system limitation due to heating at high frequency operation, the winding configuration and overall motor configuration are also improved to take better advantage of the beneficial properties of the amorphous material.

The ability to use much higher exciting frequencies permits the present machines to be designed with a much wider range of possible pole counts. The number of poles in the present device is a variable based on the permissible machine size (a physical constraint) and on the expected performance range. Subject to allowable excitation frequency limits, the number of poles can be increased until magnetic flux leakage increases to an undesirable value, or performance begins to decrease.

There is also a mechanical limit presented by stator construction on the number of rotor poles, since stator slots must coincide with the rotor magnets. Mechanical and electromagnetic constraints in concert limit the number of slots that can be made in the stator. These effects, in turn, are in part a function of the frame size of the machine. Some boundaries can be set to determine an upper limit on slot number for a given stator frame that provides a proper balance of copper and soft magnetic material. Adjustment of the balance can be used as a parameter in making well performing axial gap machines. The present invention provides motors that optimally have about 4 or 5 times the number of poles typical for current industrial machines of comparable physical size.

As an example, for an industry typical motor having 6 to 8 poles, and operating at speeds of about 800 to 3600 rpm, the commutating frequency is about 100 to 400 Hz. The commutating frequency (CF, in Hz) is the rotating speed multiplied by the number of pole pairs, where the pole pairs is the number of poles divided by two, and the rotating speed is in units of revolutions per second (CF=rpm/60×pole/2). Also available in industry are devices with 16 or more poles, but speeds of less than 1000 rpm, which still correspond to a frequency less than 400 Hz. Alternatively, motors are also available with a relatively low pole count (e.g. less than 6 poles), and with speeds up to 30,000 rpm, which still have a commutating frequency less than about 400 Hz. In representative embodiments, the present invention provides machines that have 96 poles, for 1250 rpm at 1000 Hz; 54 poles, for 3600 rpm at 1080 Hz; 4 poles, for 30,000 rpm at 1000 Hz; and 2 poles, for 60,000 rpm at 1000 Hz. The high frequency machines of the invention can operate at frequencies of about 4 to 5 times higher than known axial airgap motors made with conventional materials and designs. The machines provided are generally more efficient than typical motors in the industry when operated in the same speed range, and as a result provide greater speed options. The present configuration is particularly attractive for the construction of motors having a very wide range of speed, power, and torque ratings, in a manner that combines high energy efficiency, high power density, ease of assembly, and efficient use of expensive soft and hard magnetic materials.

Thermal Properties And Efficiency

One of the characteristics that limits attainable device output efficiency in all electric machines, including both those using conventional Si—Fe alloys and those using improved, low core loss soft magnetic materials, is the loss of energy to waste heat. This waste heat comes from a number of sources, but predominantly from ohmic losses, skin and proximity effect losses in the windings, rotor losses from eddy currents in magnets and other rotor components, and core loss from the stator core. The "continuous power limit" of conventional machines is often determined by the maximum speed at which the machine can operate continuously while still dissipating enough of the waste heat to prevent an unacceptable temperature rise. The continuous power limit is a function of the current.

In the high frequency, high pole count electric devices optimally applicable in the practice of the present invention, less waste heat is generated because amorphous, nanocrystalline, and optimized Fe-based metal alloy have lower losses than conventional Si—Fe. The designer can exploit the low loss characteristics of these materials by increasing the frequency, speed and power, and then correctly balancing and "trading" the low core loss versus the ohmic loss. Overall, for the same power as conventional machines, the high frequency, high pole count electric devices optimally applicable in the present invention exhibit lower loss, and hence higher torques and speeds, and can thus achieve higher continuous speed limits than conventional machines.

One advantage of the machine preferred in the practice of an aspect of the present invention is the ability to maximize the device's efficiency while maintaining cost effectiveness. As is conventional, device efficiency is defined as useful power output divided by power input. The high-frequency, high pole count electric devices optimally applicable in the present invention operate simultaneously at higher commutating frequencies with high pole count, resulting in a more efficient device having low core losses and high power density. They exceed the industry standard high frequency limit of 400 Hz, beyond which there have heretofore been few, if any practical applications.

The performance and increased efficiency of the preferred high-frequency, high pole count electric devices applicable to the present invention are not simply inherent features of replacing conventional Si—Fe with amorphous metal. A number of designs with amorphous metal have been proposed, but have met with performance failure (including overheating and lower output power). This failure is believed to have arisen in large measure as a result of merely applying new materials (e.g., amorphous metals) and production methods in manners that were designed for, and suitable to, a conventional material (Si—Fe containing 3.5% or less of Si by weight). The early performance failure, combined with the perceived cost of processing amorphous metal into motors, led the industry to abandon the research efforts.

The presently preferred electric devices overcome the performance failures of the prior art through the design of a rotating electric machine that exploits the beneficial properties of amorphous, nanocrystalline, or optimized Fe-based metal alloy, or grain-oriented or non-grain-oriented Fe-based materials. Also provided are construction methods compatible with the physical and mechanical characteristics of the various improved materials. These designs and methods provide machines that possess some or all of various advantageous qualities, including operating at commutating frequencies greater than 400 Hz, with a high pole count, at high efficiency and with a high power density. While other conventional methods have sometimes been able to provide motors with at most one or two of the four qualities, among the embodiments provided herein are high frequency, high pole count electric devices that exhibit some, and preferably all of, the four qualities simultaneously. While machines including those provided by the '094 application afford reduced magnetic losses by using low loss stator materials, the present machine provides yet another mechanism by which losses may be reduced and efficiency increased, namely through use of an improved, stacked-coil winding configuration.

As a result of the increased efficiency, the high frequency, high pole count electric devices optimally applicable in the present invention are also capable of achieving a greater continuous speed range. Conventional motors are limited in that they can either provide low torque for high-speed ranges (low power), or high torque for low-speed ranges. The high frequency, high pole count electric devices optimally applicable in the present invention successfully provide electric devices with high torque for high-speed ranges.

Electric Device Cooling

Cooling the stator coil windings can be a challenge in any electric device design. Although machines constructed in accordance with the principles herein generally provide a significant improvement in efficiency over prior art devices, they may further benefit from improved cooling for certain highly demanding requirements. In many practical machines, dissipation of ohmic heating in windings is a principal limitation on steady-state machine output. Conventional motors frequently employ convective cooling using air circulated by a rotating blow on the motor shaft, but the heat transfer in this arrangement can only occur at the external surfaces of the windings and other components.

Figure 13:
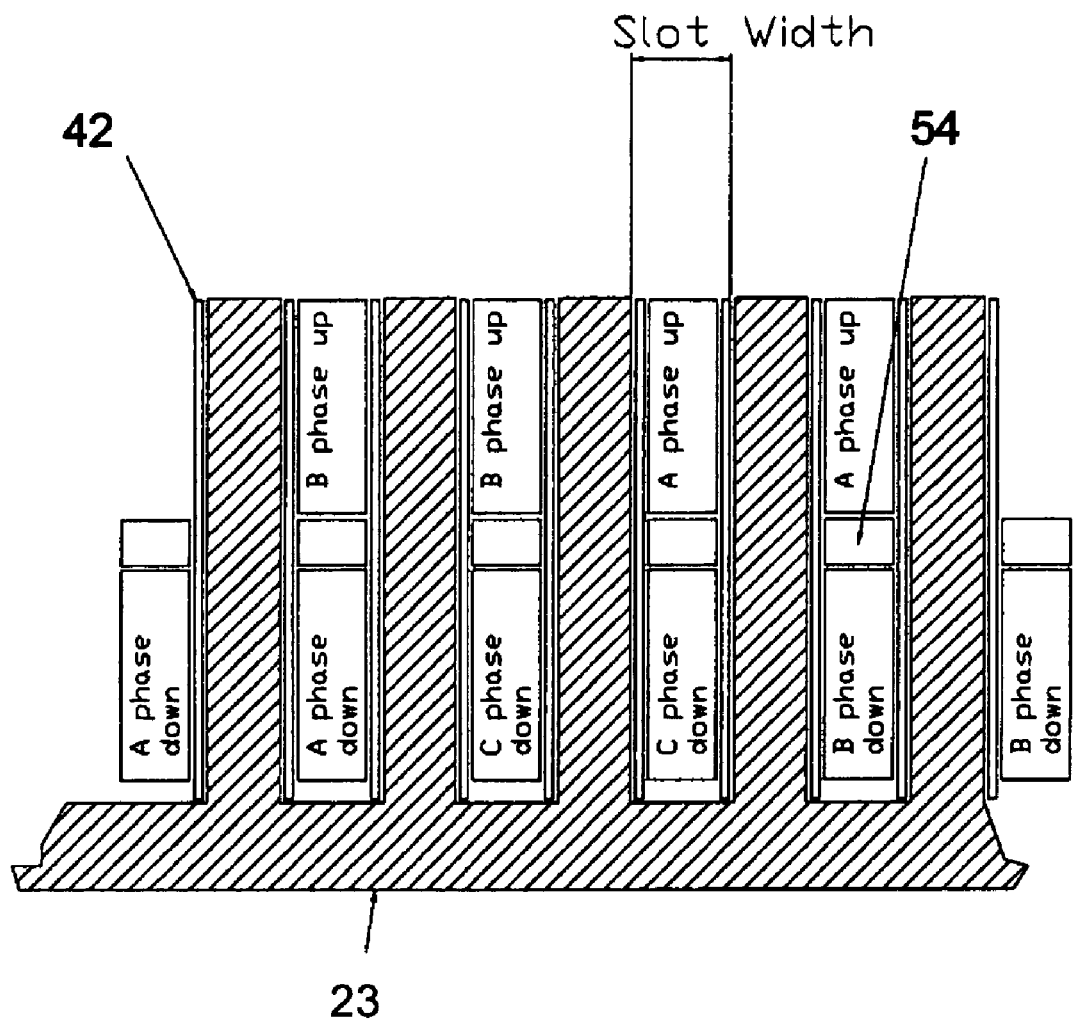
FIG. 13 illustrates a stator structure wound according to the present invention, including a cooling system.

The alternating stacking of the stator phase coils according to the present invention allows the use of cooling means disposed within the stator slots. Enough space for such means can be provided in certain embodiments without causing serious reduction of device performance. For example, heat conducting devices or materials may be disposed in channels between adjacent phase windings in some or all of the stator slots. Any suitable heat-conducting medium may be used, including non-exclusively the passive devices disclosed in U.S. Pat. No. 6,259,347, which is incorporated herein in the entirety by reference thereto. Other heat conducting materials, heat pipes, or the like may also be used. Also suitable are active systems that provide a liquid or gaseous cooling fluid circulated using some external mechanism. FIG. 13 illustrates an embodiment of the present invention including an electrically insulated cooling channel 54 located between the stacked stator coil windings instead of insulation 48 in layer form, such as paper or polymeric film. In alternate embodiments, both cooling channel 54 and one or more layers of insulation 48 are present. In still other embodiments the cooling channel is simply an open channel without walls, necessitating the use of liquid or gaseous coolant with adequate dielectric strength to resist breakdown. The use of cooling means, including circulating coolant or heat conducing media greatly improves the efficacy of heat removal from within the windings.

Flexibility in Wiring/Winding Design

A further advantage of certain embodiments of the present machine is the flexibility of utilizing different wiring configurations. Traditional stator designs limit winding design choices because of the above-mentioned focus on using SPP ratios of 1.0 to 3.0, which require distributing the windings over multiple slots. It becomes difficult to have more than two or three winding options with distributed windings. The present invention provides the ability to take advantage of the SPP=0.5 design, wherein there is typically only one discrete coil per stator core (including the tooth). However, the invention does not exclude other arrangements with SPP=0.5. Plural coils can be easily modified and re-connected to provide any voltage demanded by a given application, while maintaining up and down coil series pairing. Thus, given an SPP ratio approaching 0.5 as in the device of this invention, there is significant flexibility as to stator winding configurations. For example, the manufacturer may wind each stator separately from one another, or the manufacturer may provide separate stator windings within the same stator. This capability is one of the advantages of a system with a SPP equal to 0.5. Although there have occasionally been industry systems that employ SPP=0.5, they are not widespread and have met with success only in niche applications. The present invention successfully provides a system with SPP equal to 0.5 that allows for this flexibility in winding.

Thus a given hardware configuration can provide a broad range of solutions, simply by changing the stator coils or their interconnection. Generally, the coil is the easiest component in an electromagnet circuit to modify. Significant economies and simplification are provided to the manufacturer, who needs fewer standard designs, to the distributor, who can maintain a simpler inventory, and to the user, who can modify a given machine to accommodate changing use requirements.

Machine System And Power Electronics Control

In yet another aspect, there is provided a dynamoelectric machine system comprising an axial airgap electric machine of the aforementioned type and power electronics means for interfacing and controlling the machine. The system may function as a motor or generator or a combination thereof. Motoring machines must be supplied with AC power, either directly or by commutation of DC power. Although mechanical commutation has long been used with brush-type machines, the availability of high-power semiconductor devices has enabled the design of brushless, electronic commutation means that are used with many modern permanent magnet motors. In generating mode, a machine (unless mechanically commutated) inherently produces AC. A large proportion of machines are said to operate synchronously, by which is meant that the AC input or output power has a frequency commensurate with the rotational frequency and the number of poles. Synchronous motors directly connected to a power grid, e.g. the 50 or 60 Hz grid commonly used by electric utilities or the 400 Hz grid often used in shipboard and aerospace systems, therefore operate at particular speeds, with variations obtainable only by changing pole count. For synchronous generation, the rotational frequency of the prime mover must be controlled to provide a stable frequency. In some cases, the prime mover inherently produces a rotational frequency that is too high or low to be accommodated by motors that have pole counts within practical limits for known machine designs. In such cases, the rotating machine cannot be connected directly to a mechanical shaft, so a gearbox often must be employed, despite the attendant added complexity and loss in efficiency. For example, wind turbines rotate so slowly that an excessively large pole count would be required in a conventional motor. On the other hand, to obtain proper operation with desired mechanical efficiency, typical gas turbine engines rotate so rapidly that even with a low pole count, the generated frequency is unacceptably high. The alternative for both motoring and generating applications is active power conversion. Embodiments of the present electric machine including a stator assembly with stacked winding configurations of the aforementioned types are beneficially employed with active power conversion, especially in applications involving a wide speed range and/or disparate power requirements.

As used herein, the term "power electronics" is understood to mean electronic circuitry adapted to convert electric power supplied as direct current (DC) or as alternating current (AC) of a particular frequency and waveform to electric power output as DC or AC, the output and input differing in at least one of voltage, frequency, and waveform. The conversion is accomplished by a power electronics conversion circuitry. For other than a simple voltage transformation of AC power using an ordinary transformer that preserves frequency, and simple bridge rectification of AC to provide DC, modern power conversion ordinarily employs non-linear semiconductor devices and other associated components that provide active control.

As discussed hereinabove in greater detail, machines constructed in accordance with the present invention are operable as motors or generators over a much wider range of rotational speed than conventional devices. In many cases, the gearboxes heretofore required in both motor and generator applications can be eliminated. However, the resulting benefits also generally require the use of power electronics operable over a wider electronic frequency range than employed with conventional machines.

For motoring applications of the dynamoelectric machine system, the machine is interfaced to an electrical source, such as the electrical power grid, electrochemical batteries, fuel cells, solar cells, or any other suitable source of electrical energy. A mechanical load of any requisite type may be connected to the machine shaft. In generating mode, the machine shaft is mechanically connected to a prime mover and the system is connected to an electrical load, which may include any form of electrical appliance or electrical energy storage. The machine system may also be employed as regenerative motor system, for example as a system connected to the drive wheels of a vehicle, alternately providing mechanical propulsion to the vehicle and converting the vehicle's kinetic energy back to electrical energy stored in a battery to effect braking.

Power electronics means useful in the present axial airgap machine system ordinarily must include active control with sufficient dynamic range to accommodate expected variations in mechanical and electrical loading, while maintaining satisfactory electromechanical operation, regulation, and control. The means should perform satisfactorily over the range of phase impedances that arise from the aforementioned changing permeance during each revolution. Any form of power conversion topology may be used, including switching regulators employing boost, buck, and flyback converters and pulsewidth modulation. Preferably both voltage and current are independently phase-controllable, and control of the power electronics may operate either with or without direct shaft position sensing. In addition, it is preferred that four-quadrant control be provided, allowing the machine to operate for either clockwise or counterclockwise rotation and in either motoring or generating mode. Both current-loop and velocity-loop control circuitry is preferably included, whereby both torque-mode and speed-mode control are can be employed. For stable operation, power electronics means must preferably have a control-loop frequency range at least about 10 times as large as the intended commutating frequency. For the present system, operation of the rotating machine at up to about 2 kHz commutating frequency thus requires a control-loop frequency range of at least about 20 kHz. Controllers used in motoring operations typically employ IGBT semiconductor switching elements. These devices exhibit an increase in switching losses with frequency, so that it is ordinarily preferred to operate with commutating frequencies of up to about 1000 Hz. Motor systems are thus advantageously designed with commutating frequency ranging from about 600 to 1000 Hz, allowing use of less expensive IGBTs while retaining the benefits (e.g. increased power density) resulting from the higher operating frequencies made possible by low-loss materials. For generating applications, suitable rectifier bridges permit operation at even higher commutating frequencies.

Having thus described the invention with rather full detail, it will be understood that such detail need not be strictly adhered to, but that various changes and modifications may suggest themselves to one skilled in the art. For example, although axial gap electric machines have been generally described herein, other types of electric machines may be designed according to the principles disclosed herein, such as radial gap machines or linear machines. Furthermore, the electric machines could include a number of types of electric machines other than permanent magnet machines, such as induction machines, synchronous machines, synchronous reluctance machines, switch reluctance machines, and dc electromagnet machines. In addition, other types of rotors and/or stator winding schemes are within the scope of the present invention. It is accordingly intended that such modifications be encompassed by the scope of the invention, as defined by the subjoined claims.

What is claimed is:

1. An axial airgap, polyphase dynamoelectric machine, comprising:
   (a) at least one stator assembly comprising a backiron section and a plurality of tooth sections, said stator assembly having a slot having a slot width between each adjacent pair of said tooth sections and two stacked stator phase windings present in each of said slots, each winding encircling one or more of said tooth sections and occupying substantially the full available slot width; and (b) at least one rotor assembly supported for rotation about an axis and including a plurality of rotor poles, said rotor assembly being arranged and disposed for magnetic interaction with said at least one stator assembly, and wherein said stator assembly comprises low core loss magnetic material characterized by a core loss less than "L" when operated at an excitation frequency "f" to a peak induction level "$B_{max}$" wherein L is given by the formula $L=12 \cdot f \cdot B^{1.5} + 30 \cdot f^{2.3} \cdot B^{2.3}$, the core loss, excitation frequency and peak induction level being measured in watts per kilogram, kilohertz, and teslas, respectively.

2. A method for constructing an axial airgap, polyphase dynamoelectric machine, comprising:

(a) providing at least one stator assembly comprising a backiron section and a plurality of tooth sections, said stator assembly having a slot having a slot width between each adjacent pair of said tooth sections and two stacked stator phase windings present in each of said slots, said windings consisting of equal numbers of up-coils and down-coils, each of said up-coils being connected in series with one of said down-coils, and each winding encircling one or more of said tooth sections and occupying substantially the full available slot width; and (b) providing at least one rotor assembly supported for rotation about an axis and including a plurality of rotor poles, said rotor assembly being arranged and disposed for magnetic interaction with said at least one stator assembly, wherein said stator assembly comprises low core loss magnetic material characterized by a core loss less than "L" when operated at an excitation frequency "f" to a peak induction level "$B_{max}$" wherein L is given by the formula $L=12 \cdot f \cdot B^{1.5} + 30 \cdot f^{2.3} \cdot B^{2.3}$, the core loss, excitation frequency and peak induction level being measured in watts per kilogram, kilohertz, and teslas, respectively.

3. An axial airgap, dynamoelectric machine, comprising:

(a) at least one stator assembly comprising a backiron section and a plurality of tooth sections, said stator assembly having a slot having a slot width between each adjacent pair of said tooth sections and a plurality of stacked stator phase windings, each winding encircling one or more of said tooth sections and occupying substantially the full available slot width, and said stator assembly comprising low core loss magnetic material characterized by a core loss less than "L" when operated at an excitation frequency "f" to a peak induction level "$B_{max}$" wherein L is given by the formula $L=12 \cdot f \cdot B^{1.5} + 30 \cdot f^{2.3} \cdot B^{2.3}$, the core loss, excitation frequency and peak induction level being measured in watts per kilogram, kilohertz, and teslas, respectively; and (b) at least one rotor assembly supported for rotation about an axis and including a plurality of rotor poles, said rotor assembly being arranged and disposed for magnetic interaction with said at least one stator assembly.

4. A method for constructing an axial airgap, polyphase dynamoelectric machine, comprising:

(a) providing at least one stator assembly comprising a backiron section and a plurality of tooth sections, said stator assembly having a slot having a slot width between each adjacent pair of said tooth sections and a plurality of stacked stator phase windings, each winding encircling one or more of said tooth sections and occupying substantially the full available slot width, and said stator assembly comprising low core loss magnetic material characterized by a core loss less than "L" when operated at an excitation frequency "f" to a peak induction level "$B_{max}$" wherein L is given by the formula $L=12 \cdot f \cdot B^{1.5} + 30 \cdot f^{2.3} \cdot B^{2.3}$, the core loss, excitation frequency and peak induction level being measured in watts per kilogram, kilohertz, and teslas, respectively; and (b) providing at least one rotor assembly supported for rotation about an axis and including a plurality of rotor poles, said rotor assembly being arranged and disposed for magnetic interaction with said at least one stator assembly.

* * * * *